(12) United States Patent
Inoguchi

(10) Patent No.: US 6,646,811 B2
(45) Date of Patent: Nov. 11, 2003

(54) OPTICAL ELEMENT AND COMPOUND DISPLAY APPARATUS USING THE SAME

(75) Inventor: Kazutaka Inoguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 213 days.

(21) Appl. No.: 09/837,301

(22) Filed: Apr. 19, 2001

(65) Prior Publication Data

US 2002/0163734 A1 Nov. 7, 2002

(30) Foreign Application Priority Data

Mar. 1, 2001 (JP) ............................ 2001-056852

(51) Int. Cl.[7] ..................... G02B 27/14; G02B 27/12
(52) U.S. Cl. ............... 359/631; 359/630; 359/633; 359/637; 359/639
(58) Field of Search ................. 359/619, 626, 359/630, 629, 637, 639, 631, 676, 720, 633, 728; 250/494.1; 345/6, 7, 8

(56) References Cited

U.S. PATENT DOCUMENTS

| | | | |
|---|---|---|---|
| 5,917,656 A | * 6/1999 | Hayakawa et al. | 250/494.1 |
| 5,933,279 A | * 8/1999 | Yamazaki | 345/7 |
| 5,995,291 A | * 11/1999 | Togino | 250/494.1 |
| 6,023,373 A | * 2/2000 | Inoguchi et al. | 349/11 |
| 6,104,537 A | 8/2000 | Togino | 359/629 |
| 6,120,156 A | * 9/2000 | Akiyama | 359/365 |
| 6,128,137 A | 10/2000 | Togino | 359/631 |
| 6,337,776 B1 | * 1/2002 | Kamo | 359/631 |
| 6,384,983 B1 | * 5/2002 | Yamazaki et al. | 345/8 |

FOREIGN PATENT DOCUMENTS

JP  10-333040  * 12/1998

* cited by examiner

*Primary Examiner*—Georgia Epps
*Assistant Examiner*—Jack Dinh
(74) *Attorney, Agent, or Firm*—Fitzpatrick, Cella, Harper & Scinto

(57) ABSTRACT

The present invention has as its object to provide a thin type optical system which enables both of image information displayed on display means such as a liquid crystal display to be observed and image information of which image is substantially equal to the image observed via therethrough and which is taken by image pickup means and a compound display apparatus using such optical system. For this object, the optical element according to the present invention is an optical element having on the same medium an incidence surface, an emergence surface and a plurality of eccentric reflecting surfaces eccentric relative to a reference ray Ri and having power, at least one of the plurality of eccentric reflecting surfaces being a dual purpose surface used as a transmitting surface and reflecting surface, wherein a beam incident from the incidence surface is reflected by the plurality of eccentric reflecting surfaces to thereby fold an optical path and is caused to emerge from the emergence surface, and is characterized in that the meridional section composite power of the optical element is negative.

20 Claims, 10 Drawing Sheets

OPTICAL ELEMENT AND COMPOUND DISPLAY APPARATUS USING THE SAME

BACKGROUND OF THE INVENTION

1. Field of the Invention

This invention relates to an optical element and a compound display apparatus using the same.

Besides, this invention relates to an optical system suitable for an image pickup display apparatus or the like which is enhanced in the degree of freedom of layout by the use of an optical element which is thin (thin in the direction of the visual axis) and is easy in the display and image pickup at a wide angle of field and has a free curved surface.

Besides, this invention relates to a compound display apparatus which has an image pickup optical system for introducing light from the image information of the external world and forming an image on an image pickup element and a display optical system for observing therethrough the image information displayed on display means such as liquid crystal and which is generally downsized, and particularly is suitable for an apparatus called a head mounted display (HMD) or a spectacle type display.

2. Related Background Art

There have heretofore been proposed an apparatus in which a compact CCD camera is mounted on an HMD and image information obtained from the compact CCD camera is intactly displayed on the HMD, and an apparatus in which image information obtained from a compact CCD camera is processed and converted into discrete image information, which is then displayed on an HMD. Also, there have been proposed various see-through type HMD's (HMD's designed such that the light of the external world can be directly observed at an angular magnification of about 1).

In the HMD's of such a form, it is not preferable that when the eyeball optical axis of a display optical system for observing therethrough the image information displayed on the display means of the HMD and the optical axis of the CCD camera for imaging the image information of the external world on the surface of the CCD differ from each other, a parallax occurs between these. An apparatus having an image pickup optical system and a display optical system with no parallax each other is proposed in Japanese Patent Application Laid-Open No. 4-22358 and Japanese Patent Application Laid-Open No. 5-303053.

The display optical system proposed in Japanese Patent Application Laid-Open No. 4-22358 is such that light emitted from a compact LCD passes through a half mirror, and thereafter is imaged on a compact camera. On the other hand, the image pickup optical system is such that the light of the external world passes through a plane half mirror, and thereafter is imaged on the compact camera. This plane half mirror is disposed at 45° with respect to the optical axis and therefore, the apparatus has tended to become bulky. Also, this apparatus has been of a construction in which eyepieces are in front of the eyeballs and therefore a see-through optical system is not realized.

Japanese Patent Application Laid-Open No. 5-303053 discloses a construction in which a see-through optical system is realized, but the optical system is complicated and the apparatus has tended to become very bulky.

HMD's which have solved these problems are proposed in Japanese Patent Application Laid-Open No. 10-239628, Applicant's Japanese Patent Application Laid-Open No. 11-174367, Japanese Patent Application Laid-Open No. 2000-75240, etc.

Each of the compound display apparatuses proposed in these publications uses two prism-shaped optical elements (free curved surface prism) having its so-called free curved surface having different power depending on the azimuth angle disposed appropriately in both of the display optical system and the image pickup optical system, and uses the joined surface of the both free curved surface prisms as optical path separating means such as a half mirror to thereby realize a compact compound display apparatus.

SUMMARY OF THE INVENTION

It is an object of the present invention to further improve the optical system proposed in the above-mentioned publications, and appropriately construct the free curved surface prisms (optical elements) of the display optical system and image pickup optical system and an imaging optical system to thereby provide an optical element which is compact and thin in the direction of the optical axis of the eyeball and suitable for a wider angle of field and a compound display apparatus using the same.

It is another object of the present invention to appropriately set the construction of a display optical system having a plurality of eccentric reflecting surfaces for directing a beam from display means such as a liquid crystal display (LCD) to an observer's eyeball and the construction of an image pickup optical system for imaging the image information of the external world on the surface of an image pickup element such as a CCD to thereby provide a compound display apparatus which is generally downsized and yet enables the image information of the both optical systems to be observed and imaged in a good state.

It is still another object of the present invention to provide a compound display apparatus including a see-through optical system which also enables the image information of the external world to be observed at the same time.

To solve the above noted problems, the optical element of the present invention is an optical element having on the same medium an incidence surface, an emergence surface, and a plurality of eccentric reflecting surfaces eccentric relative to a reference ray Ri and having power, at least one of the plurality of eccentric reflecting surfaces being a dual purpose surface used as a transmitting surface and reflecting surface, wherein a beam incident from the incidence surface is reflected by the plurality of eccentric reflecting surfaces to thereby fold an optical path and is caused to emerge from the emergence surface, characterized in that the meridional section composite power of the optical element is negative.

In the above-described optical element, at least one of the plurality of eccentric reflecting surfaces may be a rotation-asymmetrical surface.

Also, in the above-described optical element, the emergence surface may be a rotation-asymmetrical surface.

Also, in the above-described optical element, all of the incidence surface, the emergence surface and the plurality of eccentric reflecting surface may be rotation-asymmetrical surfaces.

Also, in the above-described optical element, design may be made such that the local meridional section focal length $f_{ypout}$ and local sagittal section focal length $f_{xpout}$ of the emergence surface and the meridional section composite focal length $f_{yp}$ and sagittal section composite focal length $f_{xp}$ of the optical element satisfy $$|f_{yp}/f_{ypout}|<2 \quad (1)$$

$$|f_{xp}/f_{xpout}|<2. \quad (2)$$

Also, in the above-described optical element, the emergence surface may have negative power.

Also, to solve the above-noted problems, the optical element of the present invention is an optical element having on the same medium an incidence surface, an emergence surface and a plurality of eccentric reflecting surfaces eccentric relative to a reference ray Ri and having power, at least one of the plurality of eccentric reflecting surfaces being a dual purpose surface used as a transmitting surface and reflecting surface, wherein a beam incident from the incidence surface is reflected by the plurality of eccentric reflecting surfaces to thereby fold an optical path and is caused to emerge from the emergence surface, characterized in that at least one of the plurality of eccentric reflecting surfaces is a rotation-asymmetrical surface, and design is made such that the local meridional section focal length $f_{ypout}$ and local sagittal section focal length $f_{xpout}$ of the emergence surface and the meridional section composite focal length $f_{yp}$ and sagittal section composite focal length $f_{xp}$ of the optical element satisfy $$|f_{yp}/f_{ypout}|<2 \tag{1'}$$

$$|f_{xp}/f_{xpout}|<2. \tag{2'}$$

A compound lens unit may have at least one rotation-asymmetrical lens of which the opposite surfaces comprise a rotation-asymmetrical surface and a rotation-symmetrical surface, respectively, and a plurality of rotation-symmetrical lenses, and all of the optical axis of the rotation-symmetrical surface of the rotation-asymmetrical lens and the optical axes of the rotation-symmetrical lenses may substantially coincide with one another.

Also, in the above-described compound lens unit, design may be made such that the local meridional section focal length $f_{yl}$ and local sagittal section focal length $f_{xl}$ of the rotation-asymmetrical surface and the meridional section composite focal length $f_{yg}$ and sagittal section composite focal length $f_{xg}$ of the compound lens unit satisfy $$|f_{yg}/f_{yl}|<1 \tag{3}$$

$$|f_{xg}/f_{xl}|<1. \tag{4}$$

Also, to solve the above-noted problems, an image pickup optical system of the present invention is an image pickup optical system which has a first optical element having on the same medium an incidence surface, an emergence surface and a plurality of eccentric reflecting surfaces eccentric relative to a reference ray Ri and having power, at least one of the plurality of eccentric reflecting surfaces being a dual purpose surface used as a transmitting surface and reflecting surface, wherein a beam incident from the incidence surface is reflected by the plurality of eccentric reflecting surfaces to thereby fold an optical path and is caused to emerge from the emergence surface, and the meridional section composite power is negative, a stop, and a compound lens unit having at least one rotation-asymmetrical lens of which the opposite surfaces comprise a rotation-asymmetrical surface and a rotation-symmetrical surface, respectively, and a plurality of rotation-symmetrical lenses, all of the optical axis of the rotation-symmetrical surface of the rotation-asymmetrical lens and the optical axes of the rotation-symmetrical lenses being substantially coincident with one another, characterized in that design is made such that light from the external world is caused to be incident from the incidence surface, is reflected by the plurality of eccentric reflecting surfaces to thereby fold the optical path and is caused to emerge from the emergence surface, and is passed through the stop, and thereafter is refracted by the compound lens unit and is imaged on an image pickup element.

In the above-described image pickup optical system, design may be made such that when the meridional section composite focal length of the entire image pickup optical system is defined as $f_y$ and the sagittal section composite focal length thereof is defined as $f_x$ and the meridional section composite focal length of the first optical element is defined as $f_{yp}$ and the sagittal section composite focal length thereof is defined as $f_{xp}$, $$-1<f_y/f_{yp}<0 \tag{5}$$

$$-1<f_x/f_{xp}<0 \tag{6}$$

are satisfied.

Also, in the above-described image pickup optical system, deflecting means for bending the optical path in a direction differing from the direction in which the optical path of the first optical element is folded may be provided between the first optical element and the stop or between the stop and the compound lens unit.

Also, to solve the above-noted problems, in the image pickup optical system of the present invention, an image pickup optical system has a first optical element having on the same medium an incidence surface, an emergence surface and a plurality of eccentric reflecting surfaces eccentric relative to a reference ray Ri and having power, at least one of the plurality of eccentric reflecting surfaces being a dual purpose surface used as a transmitting surface and reflecting surface, wherein a beam incident from the incidence surface is reflected by the plurality of eccentric reflecting surfaces to thereby fold an optical path and is caused to emerge from the emergence surface, and at least one of the plurality of eccentric reflecting surfaces is a rotation-asymmetrical surface, and design is made such that the local meridional section focal length $f_{ypout}$ and local sagittal section focal length $f_{xpout}$ of the emergence surface and meridional section composite focal length $f_{yp}$ and sagittal section composite focal length $f_{xp}$ of the first optical element satisfy the following conditional expressions:

$$|f_{yp}/f_{ypout}|<2 \tag{1"}$$

$$|f_{xp}/f_{xpout}|<2 \tag{2"}$$

a stop, and a compound lens unit having at least one rotation-asymmetrical lens of which the opposite surfaces comprise a rotation-asymmetrical surface and a rotation-symmetrical surface, respectively, and a plurality of rotation-symmetrical lenses, all of the optical axis of the rotation-symmetrical surface of the rotation-asymmetrical lens and the optical axes of the rotation-symmetrical lenses being substantially coincident with one another, characterized in that design is made such that light from the external world is caused to be incident from the incidence surface of the first optical element and is reflected by the plurality of eccentric reflecting surfaces to thereby fold the optical path and is caused to emerge from the emergence surface, and is passed through the stop, and thereafter is refracted by the compound lens unit and is imaged on an image pickup element.

A compound display apparatus has the above-described image pickup optical system, an image pickup element, display means and a second optical element having on the same medium an incidence surface, an emergence surface and a plurality of eccentric reflecting surfaces eccentric relative to a display reference ray Rd and having power, wherein a beam incident from the incidence surface is reflected by the plurality of eccentric reflecting surfaces to thereby fold an optical path and is caused to emerge from the emergence surface, and has the display optical system being designed to direct the light from the display means to an observer by the use of the second optical element and presenting the enlarged image of an image on the display means, one of the eccentric reflecting surfaces of the first optical element and one of the eccentric reflecting surfaces of the second optical element using the front and back surfaces of the same shape of an optical path separating surface, the optical path separating surface being a half-transmitting reflecting surface, and being caused to function as a see-through optical system for causing light from the external world to be incident from the incidence surface of the first optical element, be transmitted through the optical path separating surface, to be emerged from the emergence surface of the second optical element and to be directed to an observer, and when a see-through reference ray passing through the center of the external world and the center of the exit pupil of the see-through optical system is defined as Rs, the display reference ray Rd and the see-through reference ray Rs may substantially coincide with the optical axis of the eyeball, and each of the see-through reference ray and the reference ray Ri of the image pickup optical system may substantially coincide with the optical axis of the external world.

Also, a compound display apparatus of this invention has an image pickup optical system satisfies $$|f_{yp}/f_{ypout}|<2$$

$$|f_{xp}/f_{xpout}|<2,$$

an image pickup element, display means and a second optical element having on the same medium an incidence surface, an emergence surface and a plurality of eccentric reflecting surfaces eccentric relative to a display reference ray Rd and having power, wherein a beam incident from the incidence surface is reflected by the plurality of eccentric reflecting surfaces to thereby fold an optical path and is caused to emerge from the emergence surface, and has the display optical system being designed to direct the light from the display means to an observer by the use of the second optical element and passed the enlarged image of an image on the display means, one of the eccentric reflecting surface of the first optical element and one of the eccentric reflecting surfaces of the second optical element using the front and back surfaces of the same shape of an optical path separating surface, the optical path separating surfaces being a half-transmitting reflecting surface, and being caused to function as a see-through optical system for causing light from the external world to be incident from the incidence surface of the first optical element, be transmitted through the optical path separating surface, to be emerged from the emergence surface of the second optical element and to be directed to an observer, and when a see-through reference ray passing through the center of the external world and the center of the exit pupil of the see-through optical system is defined as Rs, the display reference ray Rd and the see-through reference ray Rs may substantially coincide with the optical axis of the eyeball, and each of the see-through reference ray and the reference ray Ri of the image pickup optical system may substantially coincide with the optical axis of the external world.

Also, in the above-described compound display apparatus, design may be made such that when the distance from the position of the evolved entrance pupil when the entrance pupil of the image pickup optical system is evolved on the visual axis to the position of the exit pupil of the display optical system is defined as $D_{pp}$ and the distance from the emergence surface of the display optical system to the exit pupil of the display optical system is defined as er.

$$0.25<D_{pp}/er<8.0 \tag{7}$$

is satisfied.

Also, to solve the above-noted problems, the compound display apparatus of the present invention has a display optical system for directing a beam from display means displaying image information thereon to an observer's eyeball, and an image pickup optical system for imaging a beam from the external world on an image pickup element, wherein the eyeball optical axis of the beam incident on the observer's eyeball of the display optical system or a virtual eyeball optical axis extended from the eyeball optical axis and the external world optical axis of a beam incident from the external world of the image pickup optical system are made substantially coincident with each other by optical path separating means provided in the optical path, and is characterized in that the image pickup optical system has a first optical element having on the same medium an incidence surface, an emergence surface and a plurality of eccentric reflecting surfaces eccentric relative to a reference ray Ri and having power, at least one of the plurality of eccentric reflecting surfaces being a dual purpose surface used as a transmitting surface and reflecting surface in one, wherein the beam incident from the incidence surface is reflected by the plurality of eccentric reflecting surfaces to thereby fold the optical path and is caused to emerge from the emergence surface, and meridional section composite power is negative.

In the above-described compound display apparatus, the image pickup optical system may have a compound lens unit having at least one rotation-asymmetrical lens of which the opposite surfaces comprise a rotation-asymmetrical surface and a rotation-symmetrical surface, respectively, and a plurality of rotation-symmetrical lenses, wherein all of the optical axis of the rotation-symmetrical surface of the rotation-asymmetrical lens and the optical axes of the rotation-symmetrical lenses are substantially coincident with one another, and the beam from the external world may be passed through the first optical element, and thereafter be directed onto the image pickup element by the compound lens unit.

Also, in the above-described compound display apparatus, design may be made such that the local meridional section focal length $f_{ypout}$ and local sagittal section focal length $f_{xpout}$ of the emergence surface of the first optical element and the meridional section composite focal length $f_{yp}$ and sagittal section composite focal length $f_{xp}$ of the optical element satisfy $$|f_{yp}/f_{ypout}|<2 \tag{1}$$

$$|f_{xp}/f_{xpout}|<2. \tag{2}$$

Also, in the above-described compound display apparatus, design may be made such that the local meridional section focal length $f_{yl}$ and local sagittal section focal length $f_{xl}$ of the rotation-asymmetrical surface of the compound lens unit and the meridional section composite focal length $f_{yg}$ and sagittal section composite focal length $f_{xg}$ of the compound lens unit satisfy $$|f_{yg}/f_{yl}|<1 \qquad (3)$$

$$|f_{xg}/f_{xl}|<1. \qquad (4)$$

Also, in the above-described compound display apparatus, design may be made such that when the meridional section composite focal length of the entire image pickup optical system is defined as $f_y$ and the sagittal section composite focal length thereof is defined as $f_x$ and the meridional section composite focal length of the first optical element is defined as $f_{yp}$ and the sagittal section composite focal length thereof is defined as $f_{xp}$, $$-1<f_y/f_{yp}<0 \qquad (5)$$

$$-1<f_x/f_{xp}<0 \qquad (6)$$

are satisfied.

Also, in the above-described compound display apparatus, design may be made such that when the distance from the position of the evolved entrance pupil when the entrance pupil of the image pickup optical system is evolved on the visual axis to the position of the exit pupil of the display optical system is defined as $D_{pp}$ and the distance from the emergence surface of the display optical system to the exit pupil of the display optical system is defined as er, $$0.25<D_{pp}/er<8.0 \qquad (7)$$

is satisfied.

DESCRIPTION OF THE PREFERRED EMBODIMENTS

Figure 1:
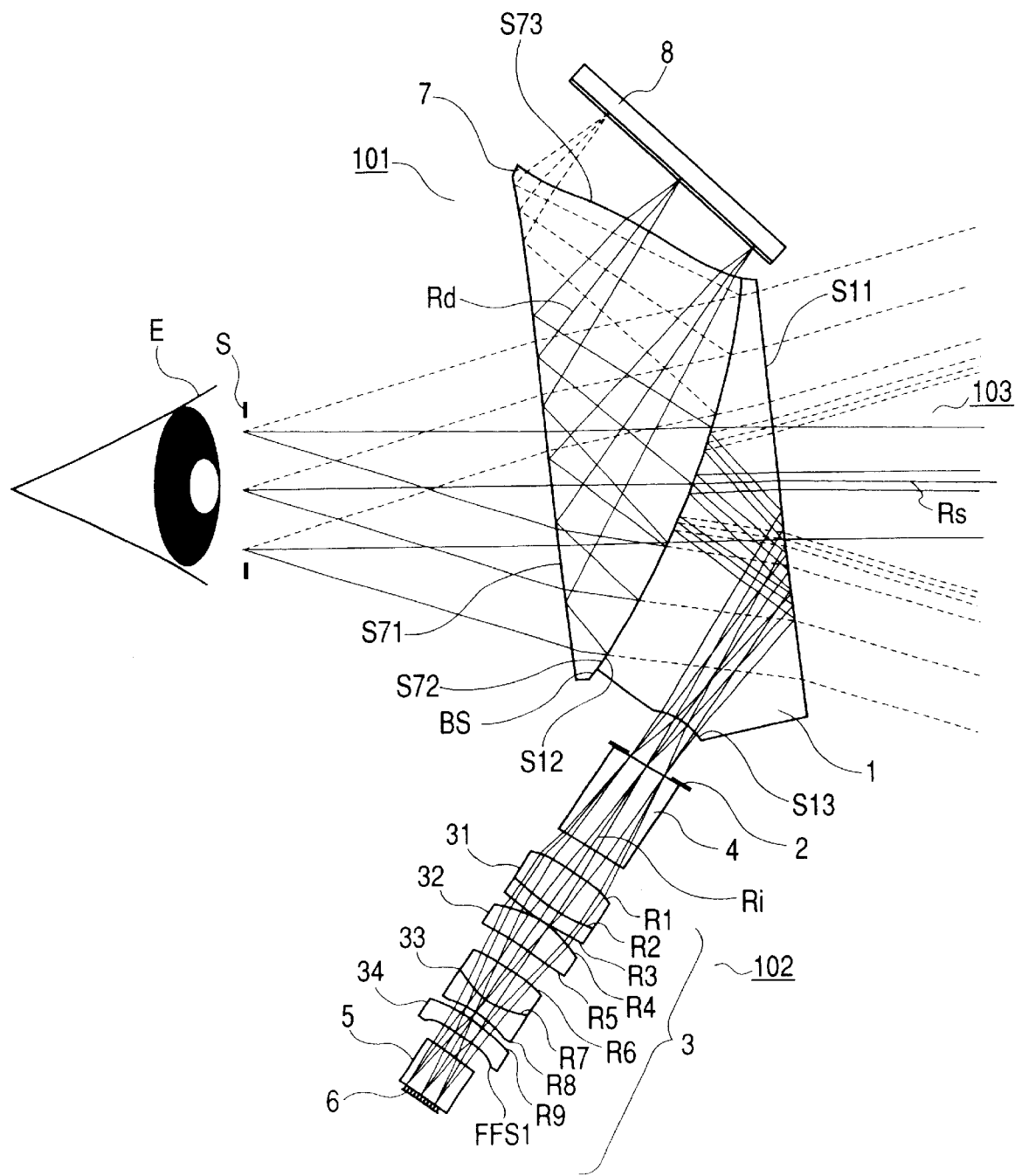
FIG. 1 is a cross-sectional view showing an example of the basic construction of the compound display apparatus of the present invention.

FIG. 1 is a schematic view of the essential portions of first embodiment forming the basic construction of the compound display apparatus of the present invention. In FIG. 1, the reference numeral 101 designates a display optical system (LCD display optical system), and this display optical system 101 has a second optical element 7 and directs image information displayed by an LCD 8 as display means to an observer's eyeball E. Rd denotes a ray passing from the center of the display surface of the LCD 8 to the center of an exit pupil S formed by the display optical system 101, and Rd is called a display reference ray. The second optical element 7 has a plurality of eccentric reflecting surfaces eccentric relative to the display reference ray Rd and having power.

Also, a line extended from the ray from the emergence surface of the second optical element 7 for Rd to the center of the exit pupil S is called an eyeball optical axis. The reference numeral 102 designates an image pickup optical system (CCD imaging optical system), and this image pickup optical system 102 has a first optical element 1, a stop 2, a compound lens unit 3, deflecting means 4, a low-pass filter 5, etc. and images the image information of the external world on a CCD 6 which is an image pickup element. Ri denotes a ray passing through substantially the center of the stop 2 to the center of the light receiving surface of the CCD 6, and Ri is called an image pickup reference ray (reference ray). Also, the ray of the image pickup reference ray Ri from the external world to the incidence surface of the first optical element 1 is called an external world optical axis, and the point to which the external world optical axis is extended by a predetermined distance toward the external world side is called the external world center.

The fist optical element 1 in the present embodiment is an optical element having on the same medium an incidence surface, an emergence surface and a plurality of eccentric reflecting surfaces eccentric relative to the reference ray Ri and having power, at least one of the plurality of eccentric reflecting surfaces being a dual purpose surface used as a transmitting surface and reflecting surface, wherein a beam incident from the incidence surface is reflected by the plurality of eccentric reflecting surfaces to thereby fold an optical path and is caused to emerge from the emergence surface, and is characterized in that the meridional section composite power of the optical element is negative.

In the present embodiment, prism members (optical elements) utilizing a plurality of internal reflections are used in both of the display optical system 101 and the image pickup optical system 102. Two prism members are joined together with optical path separating means BS as the boundary. The optical path separating means BS comprises an eccentric reflecting surface eccentric relative to Rd and Ri and having a curvature, and is a surface which separates the optical path of the display optical system 101 and the optical path of the image pickup optical system 102 from each other. The optical path separating means BS uses the reflecting surface of one side in the display optical system 101, and uses the reflecting surface of the other side in the image pickup optical system 102. In the present embodiment, the optical path separating means BS is a half mirror.

The compound lens unit 3 has at least one rotation-asymmetrical lens of which the opposite surfaces comprise a rotation-asymmetrical surface and a rotation-symmetrical surface, respectively, and a plurality of rotation-symmetrical lenses, and all of the optical axis of the rotation-symmetrical surface of the rotation-asymmetrical lens and the optical axes of the rotation-symmetrical lenses are substantially coincident with one another.

The optical axis referred to herein is the rotary axis of a rotation-symmetrical lens, and is synonymous with the so-called optical axis used in an ordinary coaxial optical system.

The reference numeral 103 designates a see-through optical system. The see-through optical system 103 uses the incidence surface of the image pickup optical system 102 as the incidence surface for the light of the external world, and the light of the external world passes through the optical path separating means BS which is a half mirror, and is directed to the observer's eyeball E with the emergence surface of the display optical system 101 as the emergence surface.

The eccentric reflecting surfaces in the present embodiment maintain good optical performance in such a manner that refractive power thereof differs depending on the azimuth angle about the surface vertex.

In the display optical system 101 in the present embodiment, the light from the LCD (display means) 8 is directed to the eyeball E through the second optical element 7. Thus, the display optical system reflects the light from the LCD 8 a plurality of times and directs it to the eyeball E without imaging it. Thereby the image information displayed on the LCD 8 is observed.

In the image pickup optical system 102, the light from the external world is passed through the first optical element 1 and is imaged on the image pickup element CCD 6 via the stop 2, the optical system 3 and the filter 5. Thereby the image information of the external world is recorded.

In the see-through optical system 103 in the present embodiment, the light from the external world is incident on the first optical element 1 of the image pickup optical system 102, is transmitted through the optical path separating means BS (half mirror) and is directed to the eyeball E through the second optical element 7 of the display optical system 101. Thereby the image information of the external world is observed.

In the present embodiment, the display optical system 101 and the image pickup optical system 102 are disposed in opposed relationship with each other with the optical path separating means BS interposed therebetween, and design is made such that the reference rays of the display optical system 101, the image pickup optical system 102 and the see-through optical system 103 pass substantially the same point on the optical path separating means BS, whereby the eyeball optical axis and the external world optical axis substantially coincide with each other, and the observation of the image information displayed on the LCD 8, the imaging of the image information of the external world on the CCD 6 and the observation (see-through optical system) of the image information of the external world can be done at a time in a parallax-free state.

The ratio between the transmittance and reflectance of the half mirror which is the optical path separating means BS is not limited to 1:1, but the ratio is arbitrary.

In the present embodiment, the first optical element and the second optical element are formed of the same material having a refractive index n (n>1), and the incidence surface of the first optical element 1 and the emergence surface of the second optical element 7 are formed into appropriate shapes, and design is made such that the power of the see-through optical system 103 becomes substantially zero and the image of the external world is observed by the observer substantially without distortion and in a state of angular magnification of about 1.

Also, Rs designates a ray passing from the center of the external world to the center of the exit pupil S of the display optical system 101 through the see-through optical system 103, and Rs is called the see-through reference ray.

In the present embodiment, design is made such that in spite of a compact construction, the display from the LCD, the image pickup onto the CCD and the see-through from the external world can be effected without any parallax in such a manner that the see-through reference ray Rs and the image pickup reference ray Ri substantially coincide with each other on the external world side (that is, Rs and Ri substantially coincide with the external world optical axis) and the see-through reference ray Rs and the display reference ray Rd substantially coincide with each other on the eyeball side (that is, Rs and Rd substantially coincide with the eyeball optical axis).

Figure 2:
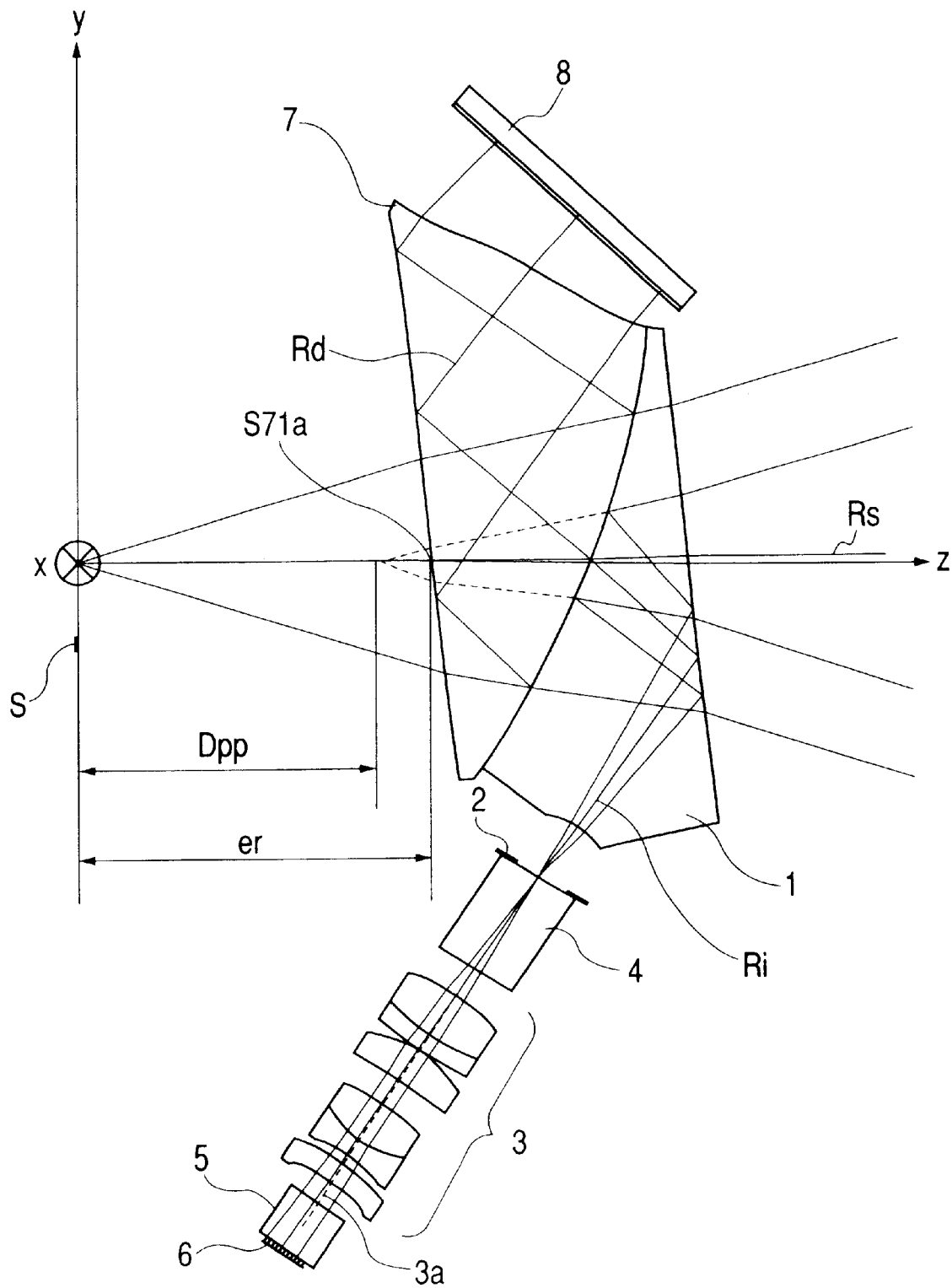
FIG. 2 is an illustration for illustrating a reference ray, a local meridional section, a local sagittal section, etc. in the compound display apparatus of the present invention.

FIG. 2 is an illustration for illustrating the reference ray, the local meridian section, the local sagittal section, etc. in the compound display apparatus of the present invention.

Figure 3:
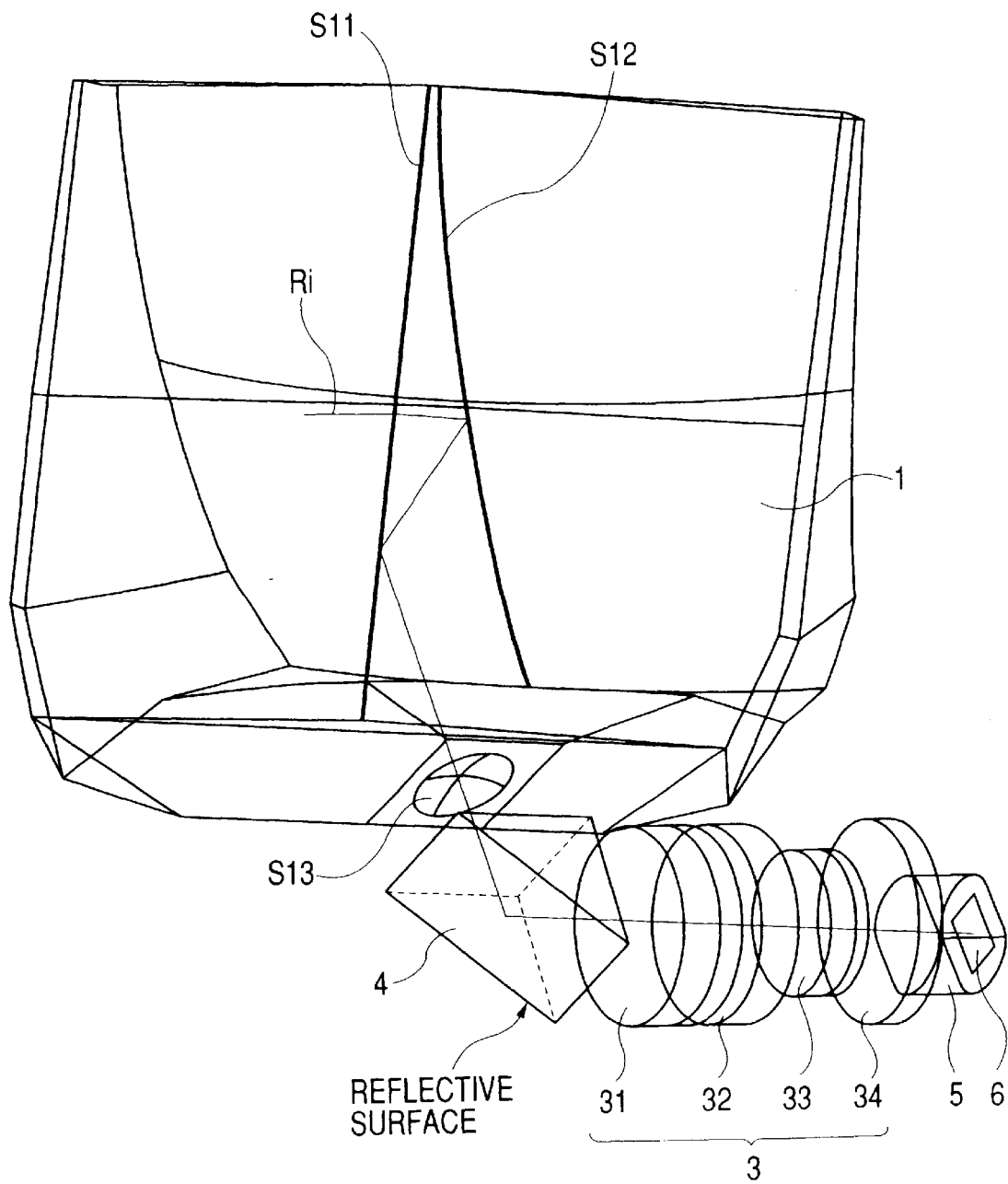
FIG. 3 is a perspective view of an example of the basic construction of the compound display apparatus of the present invention.

FIG. 3 is a perspective view of an example of the basic construction of the compound display apparatus of the present invention.

The definitions of terms such as the reference ray, the local meridian section, the local sagittal section, the meridional section composite focal length and the sagittal section composite focal length in the compound display apparatus of the present invention will first be described with reference to the drawings.

According to the definition of a conventional system which does not correspond to an eccentric system, if the z-axis is defined as the optical axis in each surface vertex coordinate system, yz section is the meridional section according to the conventional definition, and xz section is the sagittal section according to the conventional definition. The present invention is an eccentric system and therefore, the local meridional section and local sagittal section corresponding to the eccentric system will be newly defined.

First, a ray emerging from the center on the display surface of the display means 8 and passing to the center of the exit pupil S formed by the display optical system 101 is defined as a display reference ray Rd. Also, a line linking the hit point S71a of the display reference ray Rd on the emergence surface S71 of the second optical element 7 at this time and the center of the exit pupil S together is defined as the visual axis. That is, the visual axis coincides with the aforedescribed eyeball optical axis. A coordinate system in which as shown in FIG. 2, the visual axis is the z-axis, the y-axis is taken in a direction perpendicular to the z-axis in the plane of the drawing sheet of FIG. 2 and the x-axis is taken in a direction perpendicular to the plane of the drawing sheet of FIG. 2 is called a global coordinate system. A ray passing on a line extending so as to refract the visual axis by the surface S71 of the second optical element 7 and the surface S11 of the first optical element 1 in accordance with the law of refraction is defined as the see-through reference ray Rs. Also, a ray passing through the center of the stop 2 in the image pickup optical system 102 to the center of the image pickup surface of the image pickup element 6 is defined as the image pickup reference ray (reference ray) Ri.

On the hit point between each of the reference rays Rd, Rs and Ri defined as described above and each surface, a plane containing the incident light and emergent light of each reference ray is defined as the local meridional section, and a plane containing the hit point, perpendicular to the local meridian section and parallel to the sagittal section of each surface vertex coordinate system (ordinary sagittal section) is defined as the local sagittal section. When the radius of curvature of the local meridional section is defined ry, the radius of curvature of the local sagittal section is defined as rx and the refractive indices of the surfaces before and behind the pertinent surface are defined as nd and nd', respectively, $f_y$ given by $f_y = ry/(nd'-nd)$ is defined as the local meridional section focal length, and $f_x$ given by $f_x=rx/(nd'-nd)$ is defined as the local sagittal section focal length. Also, φy and φx given by $φy=1/f_y$ and $φx=1/f_x$, respectively, are defined as the local meridional section power and local sagittal section power, respectively, of each surface.

Now, when the i-th local meridional section power is defined as φyi and a value obtained by the distance between the hit point between the i-th optical surface and each reference ray and the hit point between the (i+1)th optical surface and each reference ray being divided by the refractive index of the medium therebetween is defined as a converted surface interval ei', composite power obtained from the m-th surface to the n-th surface in the same manner as ordinary paraxial pursuit calculation is defined as meridional section composite power φymn, and the inverse number fymn of φymn is defined as the meridional section composite focal length from the m-th surface to the n-th surface. Likewise, composite power obtained with respect to the local sagittal section power φxi and the converted interval ei' from the m-th surface to the n-th surface between the hit points is defined as sagittal section composite power φxmn, and the inverse number thereof is defined as the sagittal section composite focal length fxmn.

Description will now be made of the action of each element in the example of the basic construction of the embodiment of FIG. 1. The first optical element 1 and the second optical element 7 are joined together on surfaces S12 and S72 of the same shape in a state in which half-transmitting reflecting film is formed on at least one of these surfaces, and the surfaces S12 and S72 function as the optical path separating means BS.

The light from the display means 8 enters the second optical element 7 from the incidence surface S73 thereof. Most of the effective beam of the light which has entered travels toward a surface S71 having power and disposed eccentrically relative to the display reference ray Rd, and when the refractive index of the medium of the second optical element 7 is defined as n, is incident on the surface S71 at an angle of incidence of arcsin (1/n) or greater than that angle and is internally totally reflected. The beam reflected in this manner is reflected by the surface S72 eccentric relative to the display reference ray Rd and having power and again travels toward the surface S71, and now is incident on the surface S71 at an angle of incidence smaller than arcsin (1/n) and is transmitted through the surface S71, and is directed an exit pupil S formed by the display optical system 101. By the above-described construction, an image displayed on the display means 8 is enlarged and presented to the observer having his or her eyeball E placed near the exit pupil S. By adopting a construction in which as described above, the optical path is folded by the plurality of eccentric reflecting surfaces S71 and S72 eccentric relative to the display reference ray Rd, there is provided a construction which is thin in the direction of the visual axis.

Also, both of the plurality of eccentric reflecting surfaces S71 and S72 are made into surfaces having power to thereby achieve a reduction in the number of optical surfaces. In this case, it is preferable to make at least one of the eccentric reflecting surfaces into a rotation-asymmetrical surface having the meridional section (the plane of the drawing sheet) as the only symmetrical plane to thereby correct eccentric aberration caused by the eccentric reflecting surface having power. Further, if the plurality of eccentric reflecting surfaces or all the surfaces are made into rotation-asymmetrical surfaces having the meridional section as the only symmetrical plane, it will become possible to correct eccentric aberration better, and this is preferable. Also, the surface S71 which is the eccentric reflecting surface is made into a surface acting to internally totally reflect and transmit to thereby construct a display optical system which is reduced in the number of surfaces and is small in the loss of the quantity of light.

Also, the light from the external world which has entered from the incidence surface S11 of the first optical element 1 is partly reflected by an eccentric reflecting surface S12 eccentric relative to the image pickup reference ray Ri and having power which is the constituent surface of the optical path separating means BS, and travels toward an eccentric reflecting surface S11 eccentric relative to the image pickup reference ray Ri and having power. This light, when the refractive index of the medium of the first optical element 1 is defined as n, is incident on the surface S11 at angle of incidence of arcsin (1/n) or greater than that angle and is internally totally reflected, and emerges from an emergence surface S13, leaves the first optical element 1, and travels toward the stop 2. The light passed through the stop 2 forms the image of the external world on the image pickup surface of the image pickup element 6 through the compound lens unit 3 having a plurality of rotation-symmetrical lenses 31, 32, 33 and at least one rotation-asymmetrical lens 34 of which one surface is a rotation-symmetrical surface R8 and the other surface is a rotation-asymmetrical surface FFS1, and the low-pass filter 5.

In this case, the meridional section (in the plane of the drawing sheet) composite power of the first optical element 1 which is a portion forward of the stop 2 in the image pickup optical system (1–5) is made negative, whereby there can be provided a so-called retrofocus type image pickup optical system of negative lead, and there is obtained a construction in which a space for the filter system 5 in front of the image pickup optical element such as a CCD, i.e., the back focal length, is sufficiently secured and yet which is suitable for the photographing of the image of the external world at a wide angle of field. More preferably, the sagittal section (a plane perpendicular to the plane of the drawing sheet) composite power of the first optical element 1 is also made negative, whereby it is possible to make the construction of the optical system suited for a wide angle of field in the direction of the sagittal section as well. Also, by providing a construction in which the optical path is folded by the plurality of eccentric reflecting surfaces S11 and S12 eccentric relative to the reference ray Ri, the first optical element 1 is made thin in the direction of the visual axis.

Also, by both of the plurality of eccentric reflecting surfaces S11 and S12 being made into surfaces having power, any optical surface which does not contribute to imaging is eliminated and thus, a reduction in the number of optical surfaces is achieved. In this case, it is preferable to make at least one of the eccentric reflecting surfaces into a rotation-asymmetrical surface having the meridional section as the only symmetrical surface to thereby correct eccentric aberration caused by the eccentric reflecting surface having power. Further, the emergence surface S13 near the stop 2 is made into a rotation-asymmetrical surface having the meridional section as the only symmetrical surface, whereby it becomes easy to correct the eccentric aberration of the pupil. More preferably, if the plurality of eccentric reflecting surfaces or all the surfaces are made into rotation-asymmetrical surfaces having the meridional section as the only symmetrical plane, it will become possible to correct eccentric aberration better. Also, by the surface S11 which is the eccentric reflecting surface being made into a surface acting to internally totally reflect and transmit, there is provided an optical element which is reduced in the number of surfaces and is small in the loss of the quantity of light.

While in the first optical element 1, the surface S12 has strong negative power, at least one of the local meridional section power and local sagittal section power of the emergence surface S13 is made negative and negative power is shared by this surface, whereby it becomes easy to increase the negative power as the entire first optical element without increasing the negative power of the surface S12 more than necessary, and there can be obtained a construction more suitable for a wide angle of field. Further, it is preferable that design be made such that the local meridional section focal length $f_{ypout}$ and local sagittal section focal length $f_{xpout}$ in the emergence surface S13 of the first optical element 1 and the meridional section composite focal length $f_{yp}$ and sagittal section composite focal length $f_{xp}$ of the first optical element 1 satisfy the following conditional expressions:

$$|f_{yp}/f_{ypout}|<2 \tag{1}$$

$$|f_{xp}/f_{xpout}|<2, \tag{2}$$

thereby well balancing the meridional section composite focal length and sagittal section composite focal length of the first optical element 1. If the upper limits of both of expression (1) and expression (2) are exceeded, eccentric aberration occurring singly in the emergence surface S13 will become great, and this is not preferable.

Also, at least one rotation-asymmetrical lens is used in the compound lens unit 3 which contributes to imaging backward of the stop 2, whereby it becomes easy to provide an image pickup optical system of high performance in which the eccentric aberration which cannot be completely corrected in the first optical element 1 is corrected. Also, the correction of chromatic aberration is effected by a plurality of rotation-symmetrical lenses so that the number of rotation-asymmetrical lenses difficult to manufacture may be made small and yet high imaging performance may be obtained. In the compound lens unit 3 in the present embodiment, as shown in FIG. 2, the rotation-symmetry axis of the rotation-symmetrical surface constituting the compound lens unit 3 are of a coaxial construction sharing an optical axis (dot-and-dash line in FIG. 2) $3a$ which is referred to in a coaxial optical system. By constructing so, the compound lens unit 3 includes rotation-asymmetrical surfaces and yet is designed to be assembled by an assembling process similar to that for an ordinary coaxial optical system, and it is made easy to omit the trouble required for the assembly.

The correction of the rotational deviation about the optical axis of a rotation-asymmetrical lens can be effected by such means as effecting direction determination relative to a lens barrel by the use of a rotation-asymmetrical lens of a partly cut-away circular shape. Also, as shown, the optical axis $3a$ of the rotation-symmetrical system need not always be coincident with the image pickup reference ray Ri. By using such a compound lens unit, it becomes easy to provide an image pickup optical system requiring few eccentricity adjustments in which only the centering of three parts, i.e., the first optical element 1, the lens barrel having the compound lens unit 3, and the image pickup element 6 is an adjustment including eccentricity.

Further, design is made such that the local meridional section focal length $f_{yl}$ and local sagittal section focal length $f_{xl}$ of the rotation-asymmetrical surface in the compound lens unit 3 and the meridional section composite focal length $f_{yg}$ and sagittal section composite focal length $f_{xg}$ of the compound lens unit 3 satisfy the following conditional expressions:

$$|f_{yg}/f_{yl}|<1 \tag{3}$$

$$|f_{xg}/f_{xl}|<1, \tag{4}$$

whereby, the meridional section focal length and the sagittal section focal length are well balanced. If the upper limits of both of expression (3) and expression (4) are exceeded, the eccentric aberration occurring singly in the pertinent rotation-asymmetrical surface will become great, and this is not preferable.

Further, it is desirable that the following conditional expressions be satisfied among the meridional section composite focal length $f_y$ and sagittal section composite focal length $f_x$ in the entire image pickup optical system and the meridional section composite focal length $f_{yp}$ and sagittal section composite focal length $f_{xp}$ of the first optical element 1:

$$-1<f_y/f_{yp}<0 \tag{5}$$

$$-1<f_x/f_{xp}<0 \tag{6}$$

If the lower limits of expression (5) and expression (6) are exceeded, the power of the first optical element relative to the power of the entire system will become too strong, and it will become difficult to correct aberration occurring in the first optical element 1 by the compound lens unit 3. Also, if the upper limits of these conditional expressions are exceeded, the achievement of a wide angle of field will become difficult.

Also, it is preferable that the image pickup optical system have deflecting means 4. The deflecting means 4 is of a triangular prism pillar shape as shown, for example, in FIG. 3, and is adapted to deflect the optical path in a direction differing from the meridian section which is the direction of fold of the optical path described with reference to FIGS. 1 and 2. In FIG. 3, there is shown such a construction that the optical path is turned back substantially perpendicularly to the meridional section, and it becomes possible to make an image pickup optical system compact as a whole in such a manner that the lengths of a global coordinate system in the y-axis direction and the z-axis direction become short.

Also, the see-through optical system is designed such that the light from the external world incident from the surface S11 of the first optical element 1 is partly transmitted through the surfaces S12 and S72 which are the constituent surfaces of the optical path separating means BS and enters the second optical element 7, and emerges from the surface S71 and is directed to the observer's eyeball E, and enables the observer to observe the image of the external world. In this case, the shapes of the surface S11 and the surface S71 are appropriately designed so that the power of the see-through optical system from the surface S71 to the surface S11 may become substantially zero and the angular magnification may become substantially 1, whereby it becomes possible to make the distortion of the image of the external world observed by the observer small.

At this time, it is preferable that design be made such that when as shown in FIG. 2, the distance from the position of the evolved entrance pupil when the entrance pupil of the image pickup optical system is evolved on the visual axis to the position of the exit pupil S of the display optical system is defined as $D_{pp}$, and the distance from the hit point (incidence point) of the emergent ray on the emergence surface S71 of the second optical element 7 constituting the display optical system to the position of the exit pupil S is defined as er, the following conditional expression $$0.25<D_{pp}/er<8.0 \tag{7}$$

is satisfied.

Here, the position of the evolved entrance pupil refers to a position at which the point of intersection between two rays passing through the center of the stop 2 and incident on the endmost position on the local meridional section on the image pickup surface of the image pickup element 6 and incident from the surface S11 and passing to the surface S12 and extended toward the exit pupil S is projected onto the visual axis. If the lower limit of expression (7) is exceeded, the image pickup optical system will become bulky. If the upper limit of expression (7) is exceeded, the deviation occurring when a short distance object is image-picked up will become great even if the image pickup angle of field of the image pickup optical system and the display angle of field of the display optical system are the same.

Also, for example, the timing of the image display on the display means and the introduction of the image of the external world by the image pickup element is shifted, whereby it is possible to eliminate the noise on the image pickup element in such a manner that the light from the display means is not imaged on the image pickup element.

In the present embodiment, by adopting the construction as described above, it is made easy to provide a compact compound display apparatus having a wide angle of field, an image pickup optical system suitable for this compound display apparatus, and an optical element (first optical element) and a compound lens unit 3 constituting the image pickup optical system.

Numerical Embodiments

First to fifth numerical embodiments of the present invention will be shown below. In each of the numerical embodiments, the display optical system is of numerical values as shown in Table 1. Also, the constructions of the image pickup optical systems of the numerical embodiments are as shown in Tables 2 to 6.

In Table 1, a position in a global coordinate system having the position of the exit pupil S as the origin (0, 0, 0) is represented by x, y, z and the rotation angle (°) about the x-axis. Also, in Tables 2 to 6, depending on the local coordinates of the surface S2 (the x, y, z coordinate system in which a function of the surface S2 is defined), up to the surface S5, the positions thereof are indicated by the position (x, y, z) of each surface vertex on the local coordinates of the surface S2 and the rotation angle (the counter-clockwise direction being positive) about the x-axis of the local coordinates axes of each surface, and in the surfaces subsequent to the surface S5, the interval to the next surface is indicated by the surface interval d (the inter-surface distance in the direction of the z-axis of the local coordinate system of the surface S5). Therefore, the positions (x, y, z) of the vertexes of the surface S6 and subsequent surfaces relative to the local coordinates of the surface S2 are not shown. Also, in the surface Sn (n-th surface) subsequent to the surface S6, the rotation angle about the x-axis of the z-axis of the local coordinate system of each surface relative to the z-axis of the local coordinate system of the surface Sn−1 is defined as a, and the surface Sn is not inclined relative to the surface Sn−1. That is, in the coaxial case, a is omitted.

As regards the other symbols in the tables, type indicates surface shape type, FFS indicates rotation-asymmetrical surfaces, SPH indicates spherical surfaces, and ASP indicates rotation-symmetrical aspherical surfaces. A symbol s represents the surface number, r represents the radius of curvature, d represents the surface interval, and nd and vd represent refractive index and Abbe number, respectively.

Also, FFS surface is a shape given by the following definitional expression:

$$z=(1/R)^*(x^2+y^2)(1+(1-(1+C1)^*(1/R)^{2*}(x^2+y^2))^{(1/2)})+C5^*(x^2-y^2)+C6^*(-1+2^*x^2+2^*y^2)+C10^*(-2^*y+3^*x^{2*}y+3^*y^3)+C11^*(3^*x^{2*}y-y^3)+C12^*(x^4-6^*x^{2*}y^2+y^4)+C13^*(-3^*x^2+4^*x^4+3^*x^{2*}y^2-4^*y^4)+C14^*(1-6^*x^2+6^*x^4-6^*y^2+12^*x^{2*}y^2+6^*y^4)+C20^*(3^*y-12^*x^{2*}y+10^*x^{4*}y-12^*y^3+20^*x^{2*}y^3+10^*y^5)+C21^*(-12^*x^{2*}y+15^*x^{4*}y^3+10^*x^{2*}y^3-5^*y^5)+C22^*(5^*x^{4*}y-10^*x^{2*}y^3+y^5)+C23^*(x^6-15^*x^{4*}y^2+15^*x^{2*}y^4-y^6)+C24^*(-5^*x^4+6^*x^6+30^*x^{2*}y^2-30^*x^{4*}y^2-5^*y^4+30^*x^{2*}y^4+6^*y^6)+C25^*(6^*x^2-20^*x^4+15^*x^6-6^*y^2+15^*x^{4*}y^2+20^*y^4-15^*x^{2*}y^4-15^*y^6)+C26^*(-1+12^*x^2-30^*x^4+20^*x^6+12^*y^2-60^*x^{2*}y^2+60^*x^{4*}y^2-30^*y^4+60^*x^{2*}y^4+20^*y^6) \quad (8)$$

It is to be understood that undesignated coefficients in the tables are 0.

TABLE 1

| type | s | r | x | y | z | a | nd | vd |
|---|---|---|---|---|---|---|---|---|
| SPH | 1 | ∞ | 0.000 | 0.000 | 0.000 | −0.00 | 1.000 | |
| FFS | 2 | −662.036 | 0.000 | −4.558 | 24.840 | 6.36 | 1.571 | 33.80 |
| FFS | 3 | −0.227 | 0.000 | −1.375 | 34.615 | −20.93 | −1.571 | 33.80 |
| FFS | 4 | −662.036 | 0.000 | −4.558 | 24.840 | 6.36 | 1.571 | 33.80 |
| FFS | 5 | −28.596 | 0.000 | 18.724 | 36.482 | 62.18 | 1.000 | |
| SPH | 6 | ∞ | 0.000 | 25.069 | 33.618 | 46.68 | 1.600 | 50.00 |
| SPH | 7 | ∞ | 0.000 | 25.225 | 33.766 | 46.68 | 1.450 | 50.00 |
| SPH | 8 | ∞ | 0.000 | 25.625 | 34.143 | 46.68 | 1.000 | |

FFS2

| | | | | | | | | |
|---|---|---|---|---|---|---|---|---|
| c 1: | 3.2961e + 02 | c 5: | −2.5107e − 03 | c 6: | −4.5579e − 04 | c10: | −4.4834e − 06 |
| c11: | 7.6751e − 06 | c12: | 6.1053e − 07 | c13: | −1.4681e − 08 | c14: | −9.4057e − 08 |
| c20: | −7.2362e − 09 | c21: | 7.9987e − 10 | c22: | −3.7631e − 09 | c23: | −4.7877e − 11 |
| c24: | −1.6833e − 11 | c25: | −7.9375e − 11 | c26: | 4.5408e − 11 | | |

FFS3

| | | | | | | | | |
|---|---|---|---|---|---|---|---|---|
| c 1: | −1.2714e + 13 | c 5: | −1.2936e − 03 | c 6: | −3.8853e − 03 | c10: | −7.6989e − 06 |
| c11: | 5.7988e − 06 | c12: | 2.8169e − 07 | c13: | −2.3948e − 07 | c14: | −3.4805e − 08 |
| c20: | 7.4620e − 11 | c21: | 6.9342e − 10 | c22: | −6.2799e − 09 | c23: | −3.9722e − 11 |
| c24: | −3.5429e − 12 | c25: | 7.3572e − 11 | c26: | −3.0433e − 11 | | |

FFS4

| | | | | | | | | |
|---|---|---|---|---|---|---|---|---|
| c 1: | 3.2961e + 02 | c 5: | −2.5107e − 03 | c 6: | −4.5579e − 04 | c10: | −4.4834e − 06 |
| c11: | 7.6751e − 06 | c12: | 6.1053e − 07 | c13: | −1.4681e − 08 | c14: | −9.4057e − 08 |
| c20: | −7.2362e − 09 | c21: | 7.9987e − 10 | c22: | −3.7631e − 09 | c23: | −4.7877e − 11 |
| c24: | −1.6833e − 11 | c25: | −7.9375e − 11 | c26: | 4.5406e − 11 | | |

FFS5

| | | | | | | | | |
|---|---|---|---|---|---|---|---|---|
| c 5: | −1.3339e − 02 | c 6: | 1.7778e − 02 | c10: | −1.2618e − 03 | c11: | 5.6605e − 04 |
| c12: | 1.9848e − 06 | c13: | −2.1787e − 05 | c14: | 6.9323e − 06 | c20: | 3.2212e − 07 |
| c21: | 1.9884e − 07 | c22: | 3.3874e − 07 | c23: | 4.4258e − 09 | c24: | 1.7429e − 09 |
| c25: | 8.0957e − 10 | c26: | −3.3367e − 09 | | | | |

TABLE 2

| type | s | r | d | x | y | z | a | nd | vd |
|---|---|---|---|---|---|---|---|---|---|
| FFS | 1 | ∞ | — | 0.000 | 13.162 | −1.721 | −26.91 | 1.571 | 33.80 |
| FFS | 2 | 0.227 | — | 0.000 | 0.000 | 0.000 | 0.00 | −1.571 | 33.80 |
| FFS | 3 | ∞ | — | 0.000 | 13.162 | −1.721 | −26.91 | 1.571 | 33.80 |
| FFS | 4 | ∞ | — | 0.000 | −18.202 | −6.047 | −77.37 | 1.000 | |
| SPH | 5 | ∞ | 8.000 | 0.000 | −19.174 | 5.814 | −76.52 | 1.755 | 27.60 |
| SPH | 6 | ∞ | 0.428 | — | — | — | — | 1.000 | |
| FFS | 7 | 157.662 | 1.000 | — | — | — | — | 1.526 | 52.10 |
| SPH | 8 | 9.959 | 0.212 | — | — | — | — | 1.000 | |
| SPH | 9 | 7.502 | 1.800 | — | — | — | — | 1.713 | 47.36 |
| SPH | 10 | −33.505 | 0.100 | — | — | — | — | 1.000 | |
| FFS | 11 | 17.341 | 2.000 | — | — | — | — | 1.526 | 52.10 |
| SPH | 12 | −12.162 | 0.471 | — | — | — | — | 1.000 | |
| SPH | 13 | −13.828 | 1.000 | — | — | — | — | 1.755 | 27.60 |
| SPH | 14 | 6.452 | 0.100 | — | — | — | — | 1.000 | |
| SPH | 15 | 5.467 | 2.000 | — | — | — | — | 1.680 | 50.94 |
| SPH | 16 | −48.072 | 0.225 | — | — | — | — | 1.000 | |
| SPH | 17 | −24.593 | 2.000 | — | — | — | — | 1.526 | 52.10 |
| FFS | 18 | −9.441 | 1.993 | — | — | — | 3.49 | 1.000 | |
| SPH | 19 | ∞ | 4.000 | — | — | — | 4.04 | 1.517 | 64.17 |
| SPH | 20 | ∞ | | | | | | | |

FFS1

| c 5: | 1.9999e − 03 | c 6: | 1.2851e − 03 | c10: | 1.9383e − 05 | c11: | 6.4896e − 06 |
|---|---|---|---|---|---|---|---|
| c12: | −1.6583e − 07 | c13: | −3.4712e − 08 | c14: | 1.2171e − 07 | c20: | −1.0498e − 09 |
| c21: | 9.0350e − 10 | c22: | 1.6886e − 09 | c23: | 4.2104e − 12 | c24: | 4.0011e − 12 |
| c25: | 2.2580e − 11 | c26: | −1.0080e − 11 | | | | |

FFS2

| c 1: | −1.2714e + 13 | c 5: | 1.2936e − 03 | c 6: | 3.8853e − 03 | c10: | 7.6989e − 06 |
|---|---|---|---|---|---|---|---|
| c11: | −5.7988e − 06 | c12: | 2.8169e − 07 | c13: | 2.3948e − 07 | c14: | 3.4805e − 08 |
| c20: | −7.4620e − 11 | c21: | −6.9342e − 10 | c22: | 6.2799e − 09 | c23: | 3.9722e − 11 |
| c24: | 3.5429e − 12 | c25: | −7.3572e − 11 | c26: | 3.0433e − 11 | | |

FFS3

| c 5: | 1.9999e − 03 | c 6: | 1.2851e − 03 | c10: | 1.9383e − 05 | c11: | 6.4896e − 06 |
|---|---|---|---|---|---|---|---|
| c12: | −1.6583e − 07 | c13: | −3.4712e − 08 | c14: | 1.2171e − 07 | c20: | −1.0498e − 09 |
| c21: | 9.0350e − 10 | c22: | 1.6886e − 09 | c23: | 4.2104e − 12 | c24: | 4.0011e − 12 |
| c25: | 2.2580e − 11 | c26: | −1.0080e − 11 | | | | |

FFS4

| c 1: | −5.2644e − 04 | c 5: | 1.7603e − 02 | c 6: | −1.1923e − 04 | c10: | 3.9067e − 05 |
|---|---|---|---|---|---|---|---|
| c11: | −3.0530e − 04 | c12: | 3.2732e − 11 | c13: | −5.2706e − 13 | c14: | −8.5901e − 13 |
| c20: | 2.1929e − 06 | c21: | 5.7596e − 07 | c22: | −4.8350e − 15 | c23: | −7.5166e − 17 |
| c24: | −1.8777e − 17 | c25: | −4.7007e 18 | c26: | 4.7033e 18 | | |

FFS8

| c 1: | 1.8804e + 03 | c 5: | 2.5263e − 03 | c 6: | 1.4699e − 03 | c10: | 3.1642e − 04 |
|---|---|---|---|---|---|---|---|
| c11: | −7.1063e − 04 | c12: | 1.9692e − 04 | c13: | −9.6323e − 06 | c14: | −1.3329e − 04 |
| c20: | 6.7260e − 06 | c21: | 8.6105e − 07 | c22: | −8.9111e − 06 | c23: | −4.3056e − 06 |
| c24: | 1.7725e − 06 | c25: | −1.2097e − 06 | c26: | 8.5418e − 07 | | |

FFS12

| c 1: | 3.7058e + 00 | c 5: | 9.1185e − 03 | c 6: | 1.6877e − 03 | c10: | −1.5604e − 04 |
|---|---|---|---|---|---|---|---|
| c11: | 5.2858e − 04 | c12: | −2.0927e − 04 | c13: | 1.6722e − 05 | c14: | −1.8449e − 06 |
| c20: | −2.5170e − 06 | c21: | −1.9704e − 06 | c22: | 8.7989e − 06 | c23: | 4.4537e − 06 |
| c24: | −2.8962e − 06 | c25: | 2.0257e − 06 | c26: | −1.0206e − 06 | | |

FFS19

| c 1: | −2.0804e + 10 | c 5: | 3.9000e − 03 | c 6: | −4.9871e − 03 | c10: | −3.8196e − 04 |
|---|---|---|---|---|---|---|---|
| c11: | −2.8484e − 04 | c12: | −3.1988e − 04 | c13: | −3.0822e − 05 | c14: | 1.4721e 04 |
| c20: | 1.0599e − 05 | c21: | 4.0142e − 06 | c22: | 6.4770e − 06 | c23: | 9.1288e − 06 |
| c24: | −4.0853e − 06 | c25: | 9.4168e − 06 | c26: | 5.8757e − 19 | | | fy −4.575
fx = 4.691
fyp = −79.207
fxp = −21.002
fy/fyp = −0.0578
fx/fxp = −0.223
fypout = −48.941

TABLE 2-continued fxpout = −50.328
fyp/fypout = −1.618
fxp/fxpout = −0.417
fy7 −216.636
fx7 −100.470
fy12 = −41.222
fx12 = 23.019
fy19 = 13.944
fx19 = 15.886
fyg = 8.299
fxg = 7.586
fyg/fy7 −0.0383
fxg/fx7 −0.0755
fyg/fy12 −0.201
fxg/fx12 −0.330
fyg/fy19 −0.595
fxg/fx19 −0.478

Description will now be made of the numerical embodiments of the display optical system and image pickup optical system according to the present invention.

First Embodiment

Figure 4:
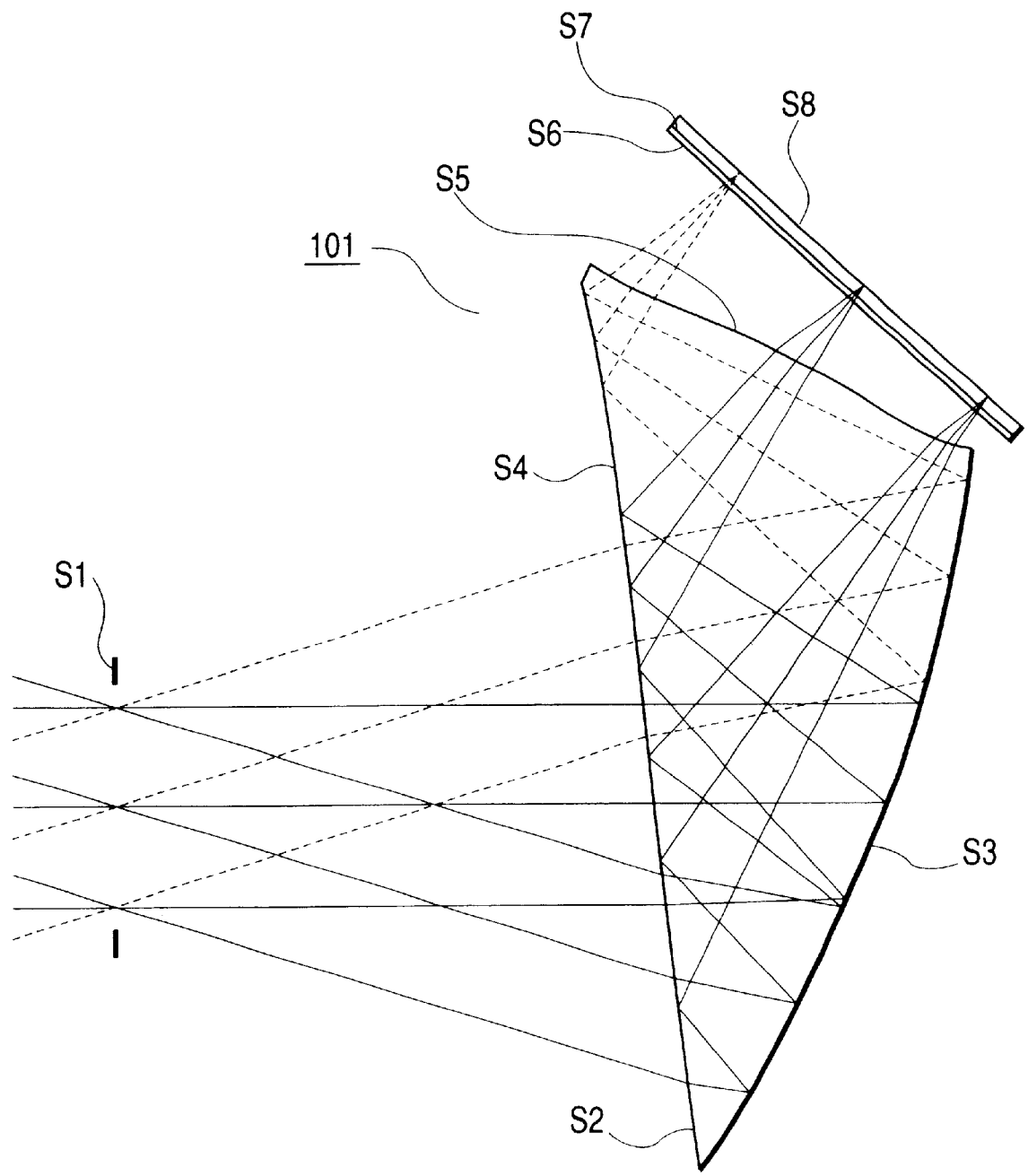
FIG. 4 shows an example of the numerical values of the display optical system of the compound display apparatus of the present invention.

FIG. 4 shows a numerical embodiment of the display optical system 101. s1 in Table 1 showing the display optical system 101 constitutes the exit pupil S, and s2 to s5 constitute the respective surfaces of the second optical element 7, and direct the light from a surface s8 corresponding to the display surface of the display means 8 is directed to the exit pupil S.

Figure 5:
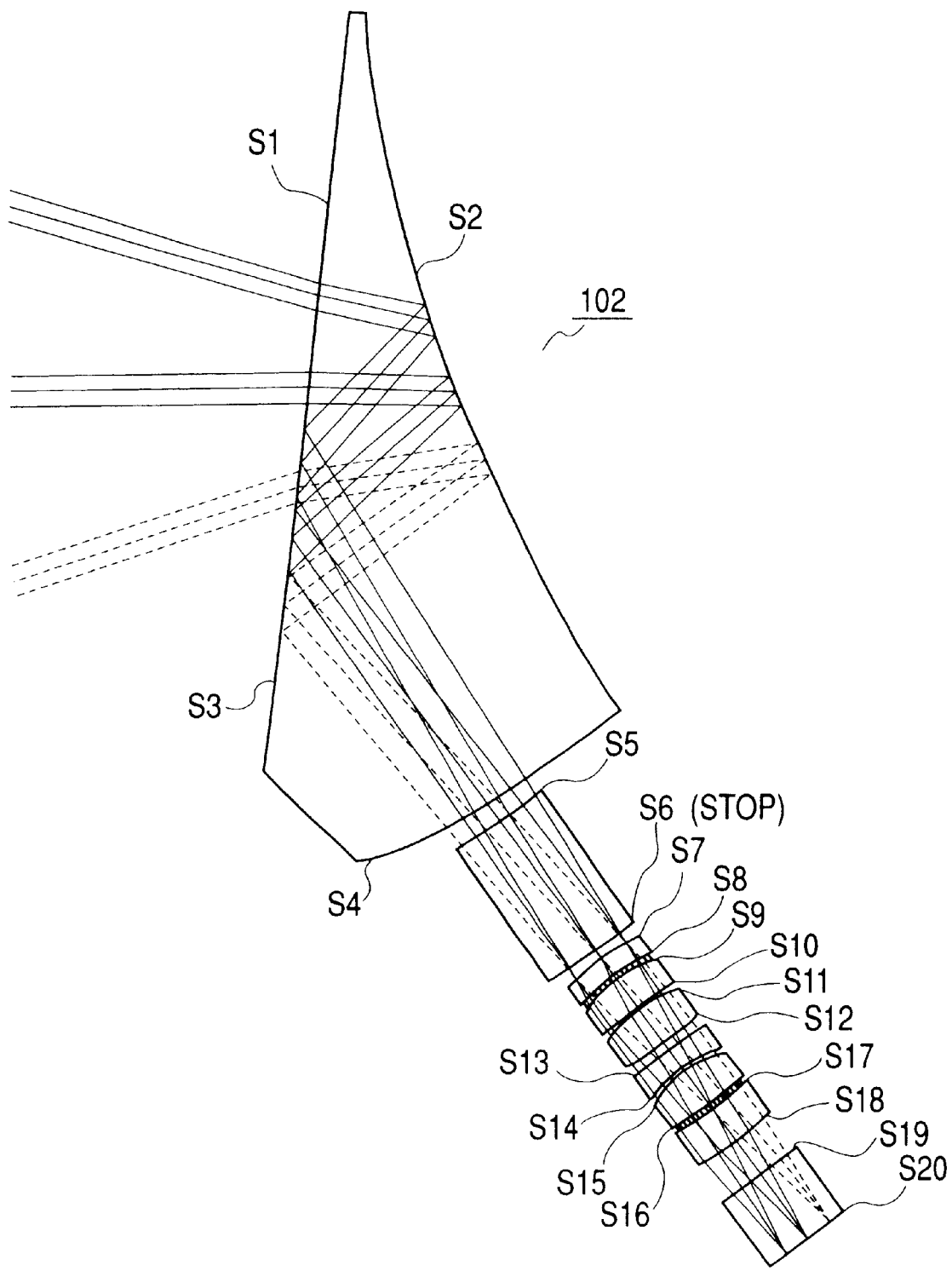
FIG. 5 is a cross-sectional view of the essential portions of a first embodiment of the image pickup optical system of the compound display apparatus of the present invention.

FIG. 5 shows Numerical First Embodiment of the image pickup optical system 102. s1 to s4 in Table 2 showing the image pickup optical system 102 represent the respective surfaces of the first optical element, and surfaces s5 and s6 are dummy glass representing the deflecting means 4. Also, the stop is represented as s6. Surfaces s7 to s18 constitute the lens units of the compound lens unit 3, and the surfaces s7 and s8 constitute a first rotation-asymmetrical lens, the surfaces s11 and s12 constitute a second rotation-asymmetrical lens, and the surfaces s17 and s18 constitute a third rotation-asymmetrical lens. The other surfaces are spherical surfaces. As can be seen from the table, the surfaces s7 to s17 are coaxially constructed, and only the surface s18 is of an inclined construction.

Surfaces s19 and s20 are the dummy glass of the filter system. The light from the external world is passed through the first optical element 1, the deflecting means 4, the stop 2, the compound lens unit 3 and the filter system 5 and is imaged on the surface s20.

The surface s3 in FIG. 4 and the surface s2 in FIG. 5 are of the same surface shape (but the direction of the z-axis is reversed and therefore the reference characters are reversely indicated) and are joined together to thereby act as the optical path separating means.

Second Embodiment

Figure 6:
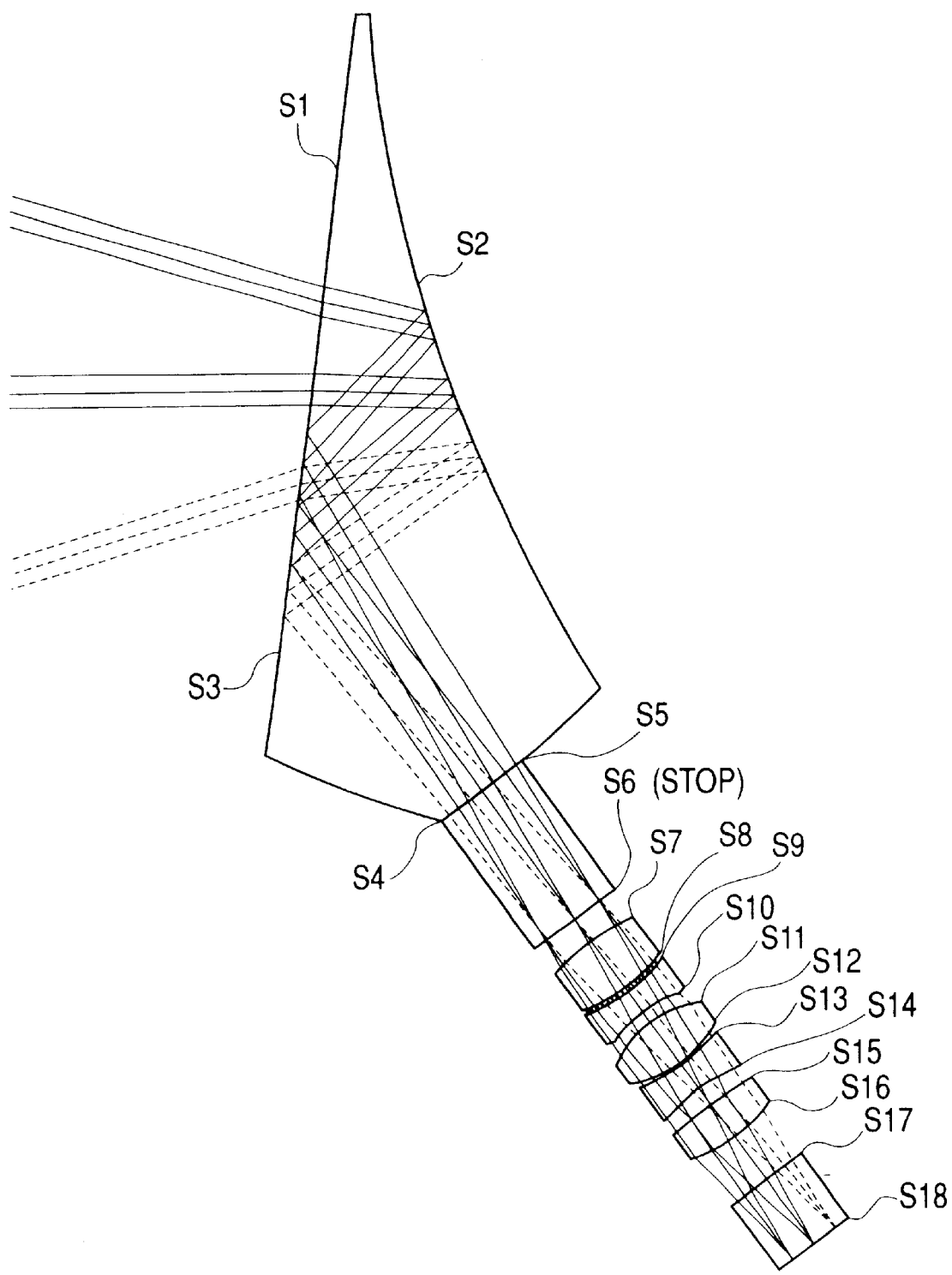
FIG. 6 is a cross-sectional view of the essential portions of a second embodiment of the image pickup optical system of the compound display apparatus of the present invention.

FIG. 6 shows Numerical Second Embodiment of the image pickup optical system 102. Surfaces s1 to s4 in Table 3 showing the image pickup optical system 102 of the present embodiment constitute the first optical element 1, and surfaces s5 and s6 are dummy glass representing the deflecting means 4. Also, the stop 2 is a surface s6. Surfaces s7 to s16 are the lens surfaces of the compound lens unit 3, surfaces s9 and s10 constitute a first rotation-asymmetrical lens, surfaces s13 and s14 constitute a second rotation-asymmetrical lens, and surfaces s15 and s16 constitute a third rotation-asymmetrical lens. The other surfaces are spherical surfaces. As can be seen from the table, the surfaces s7 to s15 are coaxially constructed, and only the surface s16 is of an inclined construction.

Surfaces s17 and s18 are the dummy glass of the filter system. The light from the external world is passed through the first optical element 1, the deflecting means 4, the stop 2, the compound lens unit 3 and the filter system 5 and is imaged on the surface s18.

The surface s3 in FIG. 4 and the surface s2 in FIG. 6 are of the same surface shape (but the direction of the z-axis is reversed and therefore the reference characters are reversely indicated), and are joined together to thereby act as the optical path separating means.

Third Embodiment

Figure 7:
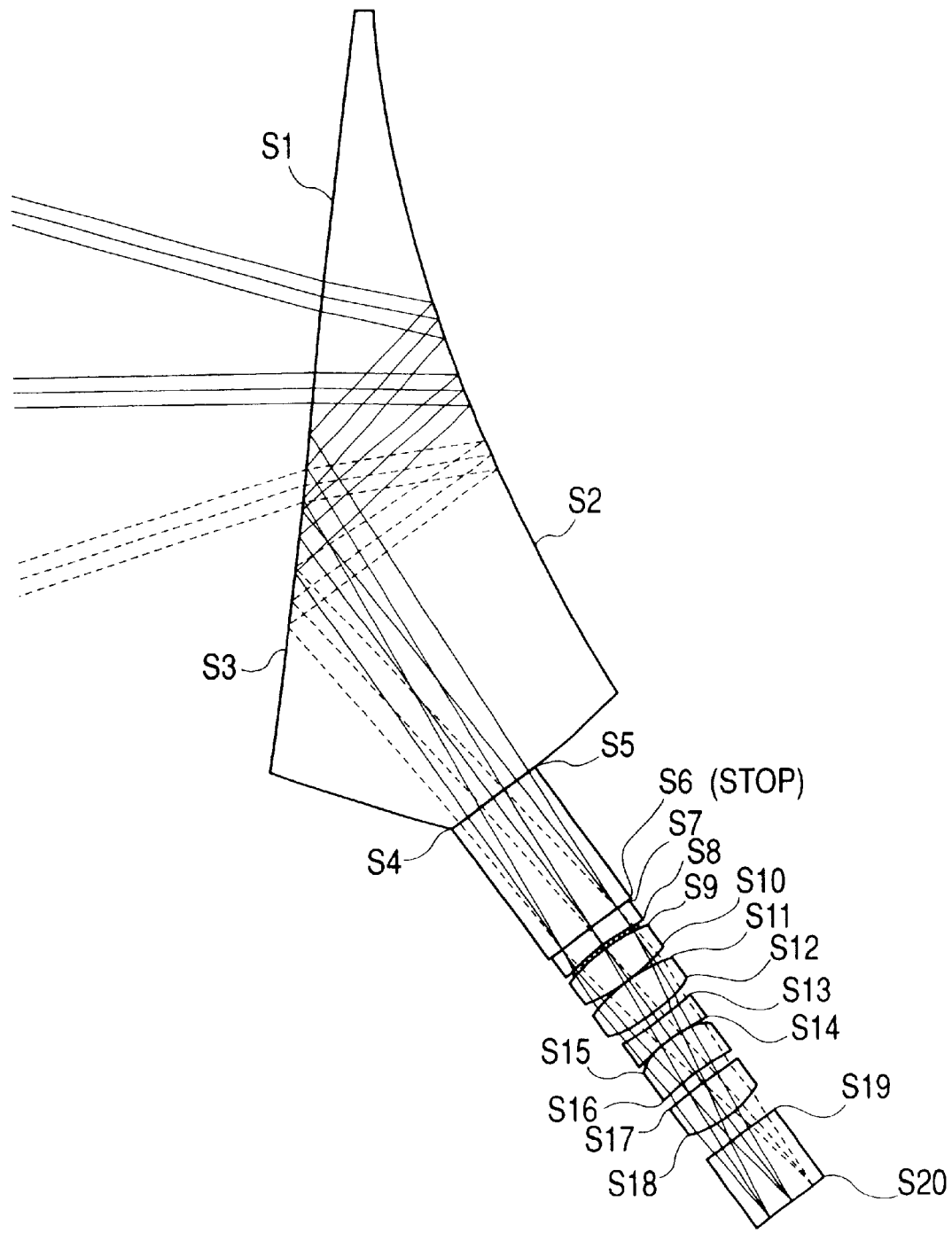
FIG. 7 is a cross-sectional view of the essential portions of a third embodiment of the image pickup optical system of the compound display apparatus of the present invention.

FIG. 7 shows Numerical Third Embodiment of the image pickup optical system 102. Surfaces s1 to s4 in Table 4 showing the image pickup optical system 102 of the present embodiment constitute the first optical element 1, and surfaces s5 and s6 are dummy glass representing the deflecting means 4. Also, the stop 2 is a surface s6. Surfaces s7 to s18 are the lens surfaces of the compound lens unit 3, the surfaces s7 and s8 constitute a first rotation-asymmetrical lens, the surfaces s11 and s12 constitute a second rotation-asymmetrical lens, and the surfaces s17 and s18 constitute a third -rotation-asymmetrical lens. The other surfaces are spherical surfaces. As can be seen from the table, the surfaces s7 to s17 are coaxially constructed, and only the surface s18 is of an inclined construction.

Surfaces s19 and s20 are the dummy glass of the filter system. The light from the external world is passed through the first optical element 1, the deflecting means 4, the stop 2, the compound lens unit 3 and the filter system 5 and is imaged on the surface s20.

The surface s3 in FIG. 4 and the surface s2 in FIG. 7 are of the same surface shape (but the direction of the z-axis is reversed and therefore the reference characters are reversely indicated) and are joined together to thereby act as the optical path separating means.

Fourth Embodiment

Figure 8:
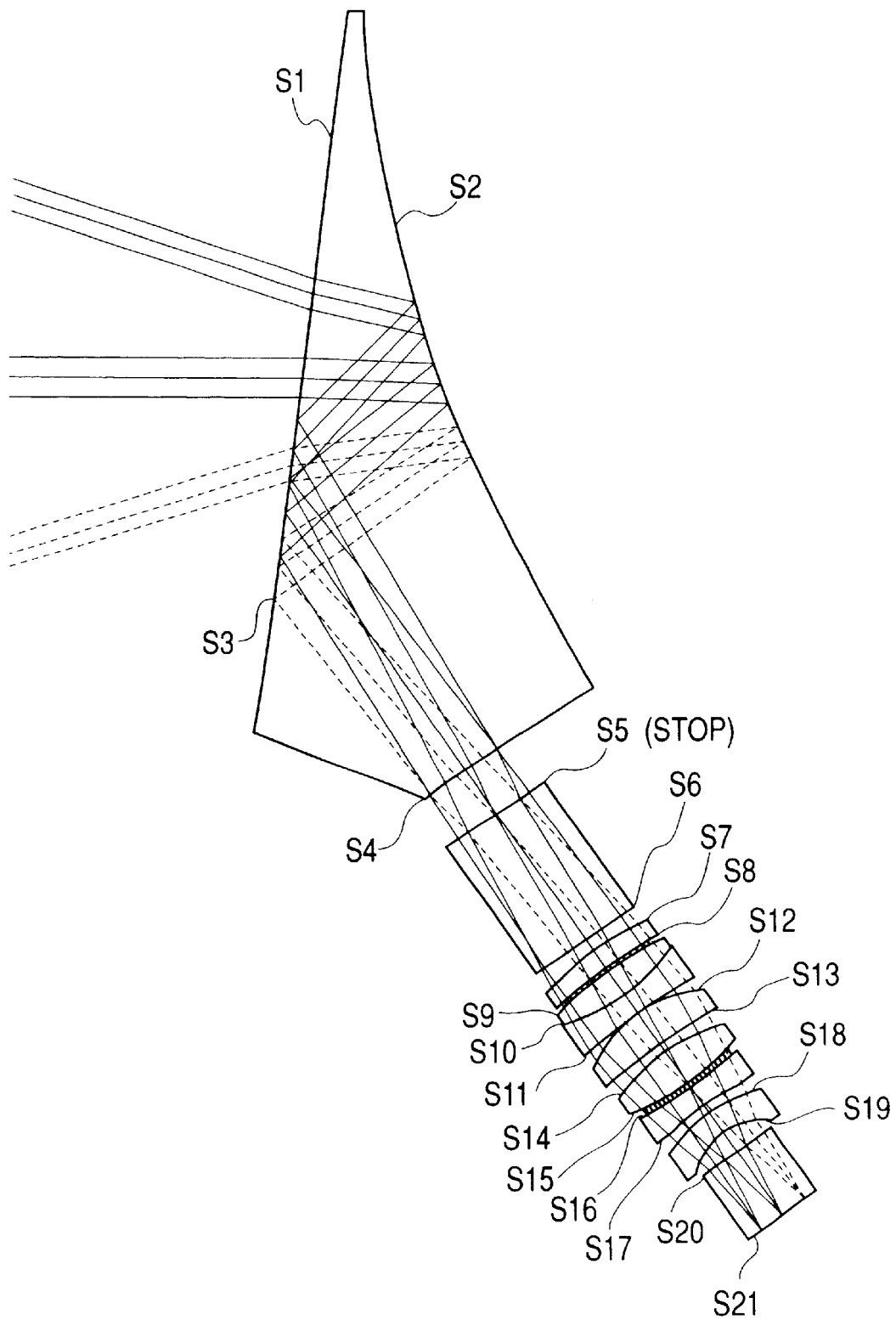
FIG. 8 is a cross-sectional view of the essential portions of a fourth embodiment of the image pickup optical system of the compound display apparatus of the present invention.

FIG. 8 shows Numerical Fourth Embodiment of the image pickup optical system 102. Surfaces s1 to s4 in Table 5 showing the image pickup optical system 102 of the present embodiment constitute the first optical element 1, and surfaces s5 and s6 are dummy glass representing the deflecting means 4. Also, the stop 2 is a surface s5. Surfaces s7 to s19 are the lens surfaces of the compound lens unit 3, the surfaces s7 and s8 constitute a first rotation-asymmetrical lens, and the surfaces s18 and s19 constitute a second rotation-asymmetrical lens. Also, the surfaces s11, s12 and s14 are rotation-symmetrical aspherical surfaces. The other surfaces are spherical surfaces. As can be seen from the table, the surfaces s7 to s18 are coaxially constructed, and only the surface s19 is of an inclined construction.

Surfaces s20 and s21 are the dummy glass of the filter system. The light from the external world is passed through the first optical element 1, the deflecting means 4, the stop 2, the compound lens unit 3 and the filter system 5 and is imaged on the surface s21.

The surface s3 in FIG. 4 and the surface s2 in FIG. 8 are of the same surface shape (but the direction of the z-axis is reversed and therefore the reference characters are reversely indicated) and are joined together to thereby act as the optical path separating means.

Fifth Embodiment

Figure 9:
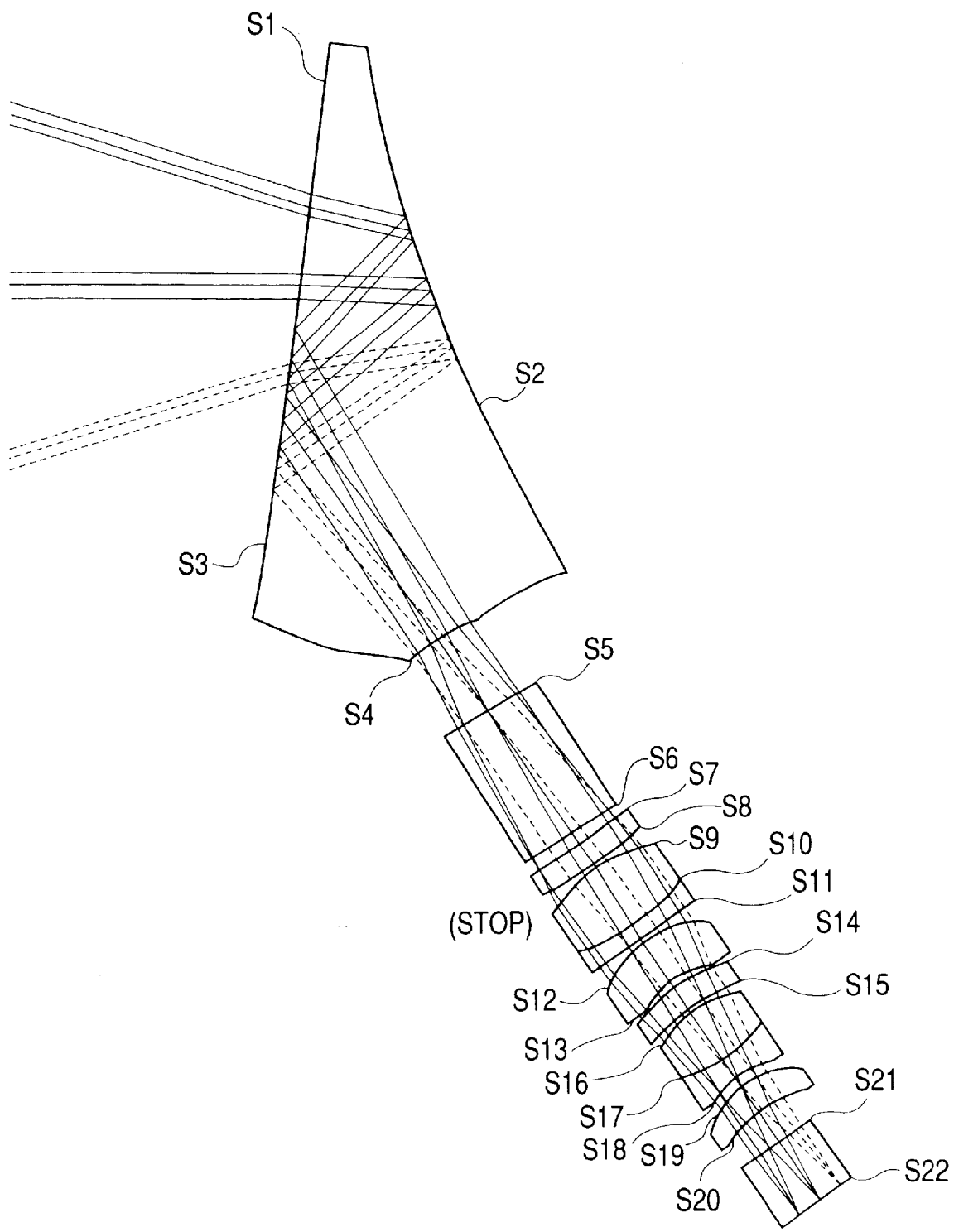
FIG. 9 is a cross-sectional view of the essential portions of a fifth embodiment of the image pickup optical system of the compound display apparatus of the present invention.

FIG. 9 shows Numerical Fifth Embodiment of the image pickup optical system 102. Surfaces s1 to s4 in Table 6 showing the image pickup optical system 102 of the present embodiment constitute the first optical element 1, and surfaces s5 and s6 are dummy glass representing the deflecting means 4. Also, the stop 2 is a surface s5. Surfaces s7 to s20 are the lens surfaces of the compound lens unit 3, the surfaces s7 and s8 constitute a first rotation-asymmetrical lens, and the surfaces s19 and s20 constitute a second rotation-asymmetrical lens. Also, the surface s12 is a rotation-symmetrical aspherical surface. The other surfaces are spherical surfaces. As can be seen from the table, the surfaces s7 to s19 are coaxially constructed, and only the surface s20 is of an inclined construction.

Surfaces s21 and s22 are the dummy glass of the filter system. The light from the external world is passed through the first optical element 1, the deflecting means 4, the stop 2, the compound lens unit 3 and the filter system 5 and is imaged on the surface s22.

The surface s3 in FIG. 4 and the surface s2 in FIG. 8 are of the same surface shape (but the direction of the z-axis is reversed and therefore the reference characters are reversely shown) and are joined together to thereby act as the optical path separating means.

Any of these constructions is an image pickup optical system having a photographing angle of field comprising a horizontal angle of field 47° and a vertical angle of field 36° relative to an image pickup element having an image pickup surface size of 3.6 mm×2.7 mm.

Figure 10:
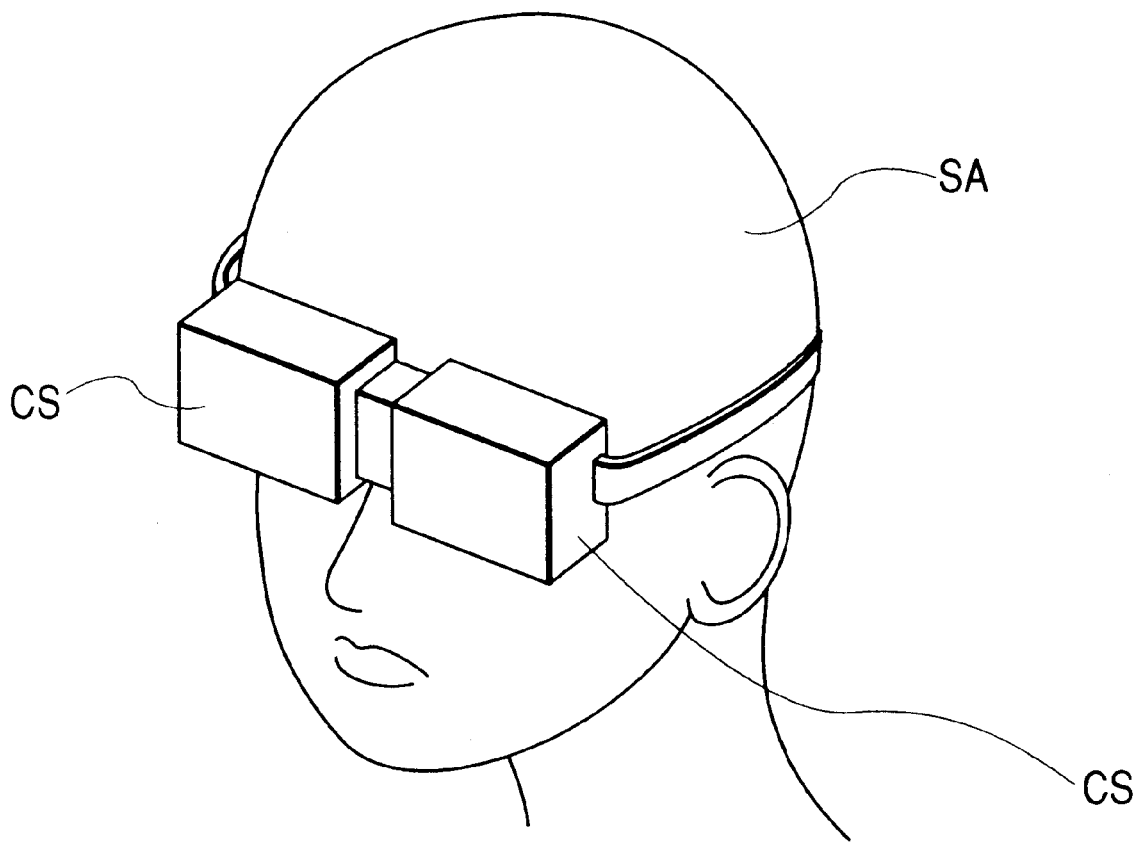
FIG. 10 is an illustration of the head mounted display of the present invention.

FIG. 10 is an illustration when a compound display apparatus CS according to each embodiment of the present invention is provided in a pair for the right and left eyes of an observer SA to thereby construct a both-eye type head mounted display.

In the present invention, if for example, a both-eye parallax is used as an image to be displayed on a display element, there can be constructed an image observation system capable of stereoscopic vision.

Of course, it is also possible to provide a single eye type HMD provided with only a unit for either of the right and left eyes.

According to the present invention, it becomes easy to achieve a thin, light-weight and bright optical system having a wide angle of field, and by using such optical system, it becomes easy to achieve a compact and light weight image display apparatus having a wide angle of field and a compound display apparatus including an image pickup apparatus.

What is claimed is:

1. An optical element comprising:
   an incidence surface for a beam;
   an emergence surface for the beam;
   a plurality of eccentric reflecting surfaces each of which is eccentric relative to a reference ray Ri and has power, which from an optical path for guiding the beam incident at said incidence surface to said emergence surface and at least one of which is rotation-asymmetrical,
   wherein local meridional section focal length $f_{ypout}$ and local sagittal section composite focal length $f_{xpout}$ of said emergence surface and meridional section composite focal length $f_{yp}$ and sagittal section focal length $f_{xp}$ satisfy $$|f_{yp}/f_{ypout}|<2 \qquad ...(1)$$

$$|f_{xp}/f_{xpout}|<2 \qquad ...(2).$$

2. An optical element according to claim 1, wherein meridional section composite power is negative.

3. An optical element according to claim 2,
   wherein all of the incidence surfaces and the emergence surfaces and the eccentric reflecting surfaces are rotation-asymmetrical surface.

4. An optical clement according to claim 1,
   wherein at least one of said plurality of eccentric reflecting surfaces is a dual purpose surface used as a transmitting surface and reflecting surface.

5. A compound lens unit comprising:
   at least one optical member having two opposite optical surfaces, wherein one optical surface is rotation asymmetrical and the other is rotation symmetrical; and
   a rotational symmetrical lens,
   wherein all optical axes of symmetrical optical surfaces of said optical member and said rotational symmetrical lens are substantially coincident.

6. A compound lens unit according to claim 5, wherein design is made such that the local meridional section focal length $f_{yl}$ and local sagittal section focal length $f_{xl}$ of said rotation-asymmetrical surface and the meridional section composite focal length $f_{yg}$ and sagittal section composite focal length $f_{xg}$ of said compound lens unit satisfy $$|f_{yg}/f_{yl}|<1 \qquad ...(3)$$

$$|f_{xg}/f_{xl}|<2. \qquad ...(4)$$

7. An image pickup optical system comprising:
   an optical element comprising:
   an incidence surface for a beam,
   an emergence surface for the beam, and
   a plurality of eccentric reflecting surfaces each of which is eccentric relative to a reference ray Ri and has power, which form an optical path for guiding the beam incident at said incidence surface to said emergence surface,
   wherein meridional section composite power is negative; and compound lens unit according to claim 5,
   wherein the light from the external world said is imaged on an image pickup element using said optical element and said compound lens unit.

8. An image pickup optical system according to claim 7, wherein design is made such that when the meridional section composite focal length of the entire image pickup optical system is defined as $f_y$ and the sagittal section composite focal length thereof is defined as $f_x$ and the meridional section composite focal length of said optical element is defined as $f_{yp}$ and the sagittal section composite focal length thereof is defined as $f_{xp}$.

$$-1 < f_y/f_{yp} < 0 \quad ...(5)$$

$$-1 < f_x/f_{xp} < 0 \quad ...(6)$$

are satisfied.

9. An image pickup optical system according to claim 7, wherein deflecting means for bending the optical path in a direction differing from the direction in which the optical path of said optical element is folded is provided between said stop and said compound lens unit.

10. A compound display apparatus comprising:
an image pickup optical system according to claim 7;
an image pickup element;
display means; and
a display optical system comprising;
  a second optical element comprising
    an incidence surface for a beam,
    an emergence surface for the beam, and
    a plurality of eccentric reflecting surfaces each of which is eccentric relative to a display reference ray Rd and has power, which form an optical path for guiding the beam incident at said incidence surface to said emergence surface,
wherein one of the eccentric reflecting surfaces of the optical element of said image pickup optical system and one of the eccentric reflecting surfaces of said second optical element have substantially the same shape and use the front and back surfaces of an optical path separating surface, and said optical path separating surface is a half-transmitting reflecting surface to form a see-through optical system,
wherein a see-through reference ray Rs, passing through the center of the external world and the center of an exit pupil of the see-through optical system, and the display reference ray Rd substantially coincides with the optical axis of the eyeball, and the see-through reference ray Rs and a reference ray Ri of the image pickup optical system substantially coincide with the optical axis of the external world.

11. An image pickup optical system comprising:
an optical element comprising:
  an incidence surface for a beam,
  an emergence surface for the beam, and
  a plurality of eccentric reflecting surfaces each of which is eccentric relative to a reference ray Ri and has power, which form an optical path for guiding the beam incident at said incidence surface to said emergence surface and at least one of which is rotation-asymmetrical,
wherein local meridional section focal length $f_{ypout}$ and local sagittal section focal length $f_{xpout}$ of said emergence surface and meridional section composite focal length $f_{yp}$ and sagittal section composite focal length $f_{xp}$ satisfy, $$f_{yp}/f_{ypout} < 2 \quad ...(1)$$

$$f_{xp}/f_{xpout} < 2, \quad ...(2)$$

and
a compound lens unit according to claim 8,
wherein the light from the external world is imaged on an image pickup element using said first optical element and compound lens unit.

12. A compound display apparatus comprising:
an image pickup optical system according to claim 11;
an image pickup element;
display means; and
a display optical system comprising;
  a second optical element comprising
    an incidence surface for a beam,
    an emergence surface for the beam,
    a plurality of eccentric reflecting surfaces each of which is eccentric relative to a display reference ray Rd and has power, which form an optical path (for guiding said beam incident at said incidence surface to said emergence surface,
wherein one of the eccentric reflecting surfaces of the optical element of said image pickup optical system and one of the eccentric reflecting surfaces of said second optical element have substantially the same shape and use the front and back surfaces of an optical path separating surface, and said optical path separating surface is a half transmitting reflecting surface to form a see-through optical system,
wherein a see-through reference ray Rs, passing through the center of the external world and the center of an exit pupil of said see-through optical system, and said display reference ray Rd substantially coincide with the optical axis of the eyeball, and said see-through reference ray Rs and a reference ray Ri of the image pickup optical system substantially coincides with the optical axis of the external world.

13. A compound display apparatus according to claim 10 or 12, wherein design is made such that when the distance from the position of the evolved entrance pupil when the entrance pupil of said image pick up optical system is evolved on the visual axis to the position of the exit pupil of said display optical system is defined as Dpp and the distance from the emergence surface of said display optical system to the exit pupil of said display optical system is defined as er, $$0.25 < D_{pp}/< 8.0 \quad ...(7)$$

is satisfied.

14. An image pickup optical system according to claim 7 or claim 11,
wherein at least one of said plurality of eccentric reflecting surfaces is a dual purpose surface used as a transmitting surface and reflecting surface.

15. A compound display apparatus
a display optical system for directing a beam from display means to an observer's eyeball; and
an image pickup optical system for imaging a beam from the external world on an image pickup element, comprising:
  an optical element comprising
    an incidence surface for a beam,
    an emergence surface for the beam, and
    a plurality of eccentric reflecting surfaces each of which is eccentric relative to a reference ray Ri and has power, which form an optical path for guiding said beam incident at said incidence surface to said emergence surface,
wherein meridional section composite power of the optical element is negative, and
wherein the optical axis of the external world in said image pickup optical system substantially coincides with an eyeball optical axis or a virtual eyeball optical axis extended from the eyeball optical axis in said display optical system.

16. A compound display apparatus according to claim 15, wherein said image pickup optical system has a compound lens unit having at least one rotation-asymmetrical lens of which the opposite surfaces comprise a rotation-asymmetrical surface and a rotation-symmetrical surface, respectively, and a plurality of rotation-symmetrical lenses, wherein all of the optical axis of the rotation-symmetrical surface of said rotation-asymmetrical lens and the optical axes of said rotation-symmetrical lenses are substantially coincident with one another, and the beam from the external world is passed through said optical element, and thereafter is directed onto said image pickup element by said compound lens unit.

17. A compound display apparatus according to claim 16, wherein design is made such that the local meridional section focal length $f_{ypout}$ and local sagittal section focal length $f_{xpout}$ of the emergence surface of said optical element and the meridional section composite focal length $f_{yp}$ and sagittal section composite focal length $f_{xp}$ of said optical element satisfy $$|f_{yp}/f_{ypout}|<2 \quad ...(1)$$

$$|f_{xp}/f_{xpout}|<2. \quad ...(2)$$

18. A compound display apparatus according to claim 17, wherein design is made such that the local meridional section focal length $f_{yl}$ and local sagittal section focal length $f_{xl}$ of the rotation-asymmetrical surface of said compound lens unit and the meridional section composite focal length $f_{yg}$ and sagittal section composite focal length $f_{xg}$ of said compound lens unit safety $$|f_{yg}/f_{yl}|<1 \quad ...(3)$$

$$|f_{xy}/f_{xl}|<1. \quad$$

19. A compound display apparatus according to claim 18, wherein design is made such that when the meridional section composite focal length of the entire image pickup optical system is defined as $f_y$ and the sagittal section composite focal length thereof is defined as $f_x$ and the meridional section composite focal length of said optical element is defined as fyp and the sagittal section composite focal length thereof is defined as $f_{xp}$.

$$-1<f_y/f_{yp}<0 \quad ...(5)$$

$$-1<f_x/f_{xp}<0 \quad ...(6)$$

are satisfied.

20. A compound display apparatus according to claim 19, wherein design is made such that when the distance from the position of the evolved entrance pupil when the entrance pupil of said image pickup optical system is evolved on the visual axis to the position of the exit pupil of said display optical system is defined as Dpp and the distance from the emergence surface of said display optical system to the exit pupil of said display optical system is defined as er, $$0.25<D_{pp}/er<8.0 \quad ...(7)$$

is satisfied.

\* \* \* \* \*

UNITED STATES PATENT AND TRADEMARK OFFICE
CERTIFICATE OF CORRECTION

PATENT NO. : 6,646,811 B2
DATED : November 11, 2003
INVENTOR(S) : Inoguchi

It is certified that error appears in the above-identified patent and that said Letters Patent is hereby corrected as shown below:

Column 2,
Line 4, "power" should read -- powers --; and
Line 30, "the both" should read -- both --.

Column 5,
Line 52, "surface" should read -- surfaces --.

Column 8,
Line 29, "fist" should read -- first --.

Column 15,
Line 31, "values" should read -- values, --; and
Line 48, "vertexes" should read -- vertices --.

Column 16,
Line 28, "(3*y-12*x" should read -- (3*y-12*x$^2$* --;
Line 30, "2*y+10*" should read -- y+10* --; and
Line 35, "y+15*x$^4$*y$^3$" should read -- y+15*x$^4$*y+4*y$^3$ --.

Column 19,
Table 2, "-2.0804e + 10" should read -- 2.0804e + 01 --.
Table 2, "fypout = -48.941" should read -- fypout = 48.941 --.

Column 22,
Table 2, "fy12 = -41.222" should read -- fy12 = 41.222 --.

Column 23,
Line 50, "of th right and" should read -- the right or --; and
Line 51, "eyes." should read -- eye. --; and
Line 66, "from" should read -- form --.

Column 24,
Line 4, "section composite" should read -- section --;
Line 19, "clement" shold read -- element --; and
Line 54, "compound" should read -- a compound --.

Column 25,
Line 63, "claim 8," should read -- claim 5, --.

UNITED STATES PATENT AND TRADEMARK OFFICE
CERTIFICATE OF CORRECTION

PATENT NO.    : 6,646,811 B2
DATED         : November 11, 2003
INVENTOR(S)   : Inoguchi It is certified that error appears in the above-identified patent and that said Letters Patent is hereby corrected as shown below:

Column 26,
Line 10, "(for" should read -- for --;
Line 40, "0.25<Dpp/<8.0" should read -- 0.25<Dpp/er<8.0 --; and
Line 48, "apparatus" should read -- apparatus comprising: --

Column 27
Line 34, "safety" should read -- satisfy --.

Column 28,
Line 12, "fyp" should read -- $f_{yp}$ --; and
Line 25, "Dpp" should read -- $D_{pp}$ --.

Signed and Sealed this

Twenty-seventh Day of July, 2004

JON W. DUDAS
*Acting Director of the United States Patent and Trademark Office*